United States Patent

Bahnsen

[15] 3,643,397
[45] Feb. 22, 1972

[54] PACKAGING MACHINE AND METHOD AND ARTICLE PRODUCED THEREBY

[72] Inventor: Erwin B. Bahnsen, Hinsdale, Ill.
[73] Assignee: Steiner American Corporation, Salt Lake City, Utah
[22] Filed: May 28, 1969
[21] Appl. No.: 828,533

[52] U.S. Cl. ....................................53/28, 53/74, 53/182
[51] Int. Cl. .....................................B65b 9/02, B65b 57/12
[58] Field of Search .............................53/28, 182, 373, 228

[56] References Cited

UNITED STATES PATENTS

| | | | |
|---|---|---|---|
| 2,747,346 | 5/1956 | Tigerman et al. | 53/28 |
| 3,191,356 | 6/1965 | Zelnick et al. | 53/182 |
| 3,295,295 | 1/1967 | Stewart et al. | 53/182 X |
| 3,340,129 | 9/1967 | Grevich | 53/182 X |
| 3,432,988 | 3/1969 | Minten | 53/182 X |
| 3,488,912 | 1/1970 | Christian | 53/182 X |

Primary Examiner—Theron E. Condon
Assistant Examiner—E. F. Desmond
Attorney—Prangley, Clayton, Mullin, Dithmar & Vogel

[57] ABSTRACT

A machine for packaging a workpiece in a heat-sealable film, including a U-shaped sealing pad and heater, means for establishing a longitudinal reach of film adjacent to the sealing pad, the sealing pad and the heater being movable between a receiving position and a sealing-severing position, means for urging the workpiece against the reach of film when the heater and the sealing pad are in the receiving position to provide superimposed lengths of film positioned between the sealing pad the the heater and forming an envelope open along one side and the ends of the workpiece, the heater in the sealing-severing position overlying the sealing pad and being in contact with the superimposed lengths of film to seal and sever the same along the one side and the ends of the workpiece. A method for packaging the workpiece in the heat-sealable film is disclosed as is the article of manufacture produced thereby.

26 Claims, 20 Drawing Figures

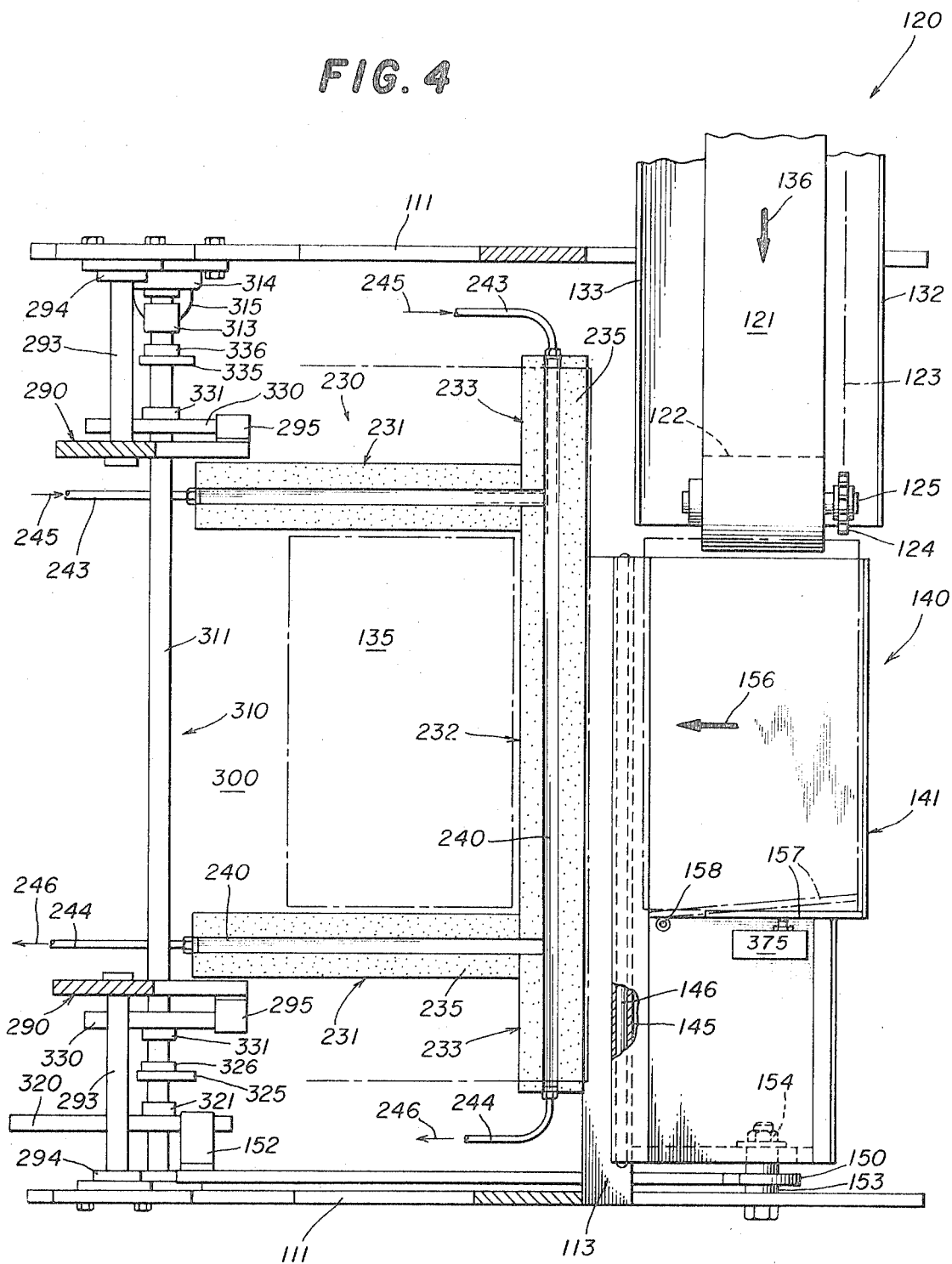

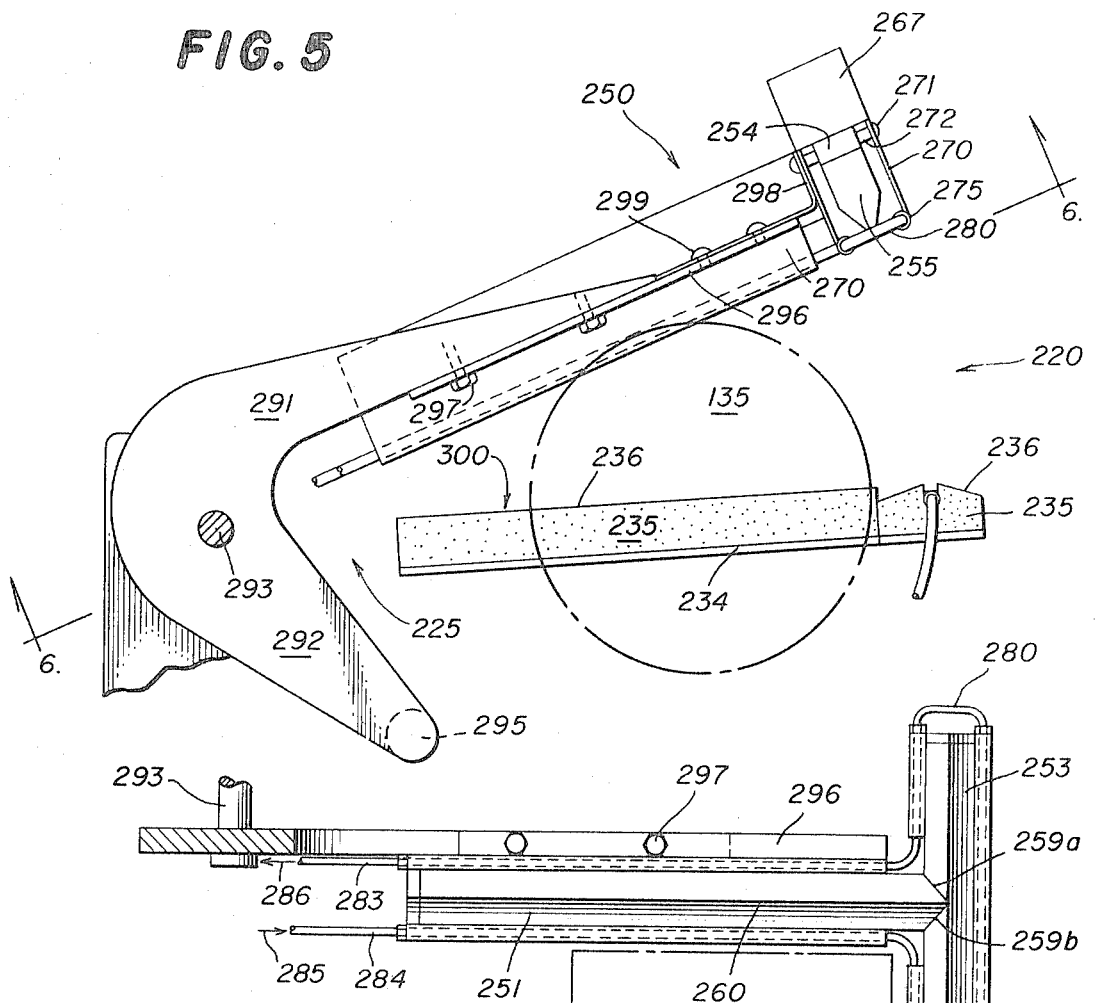
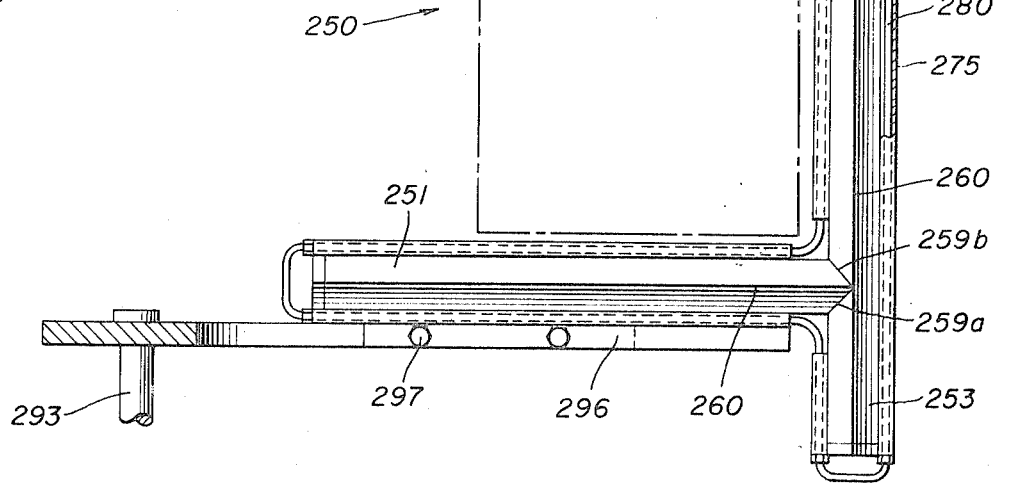

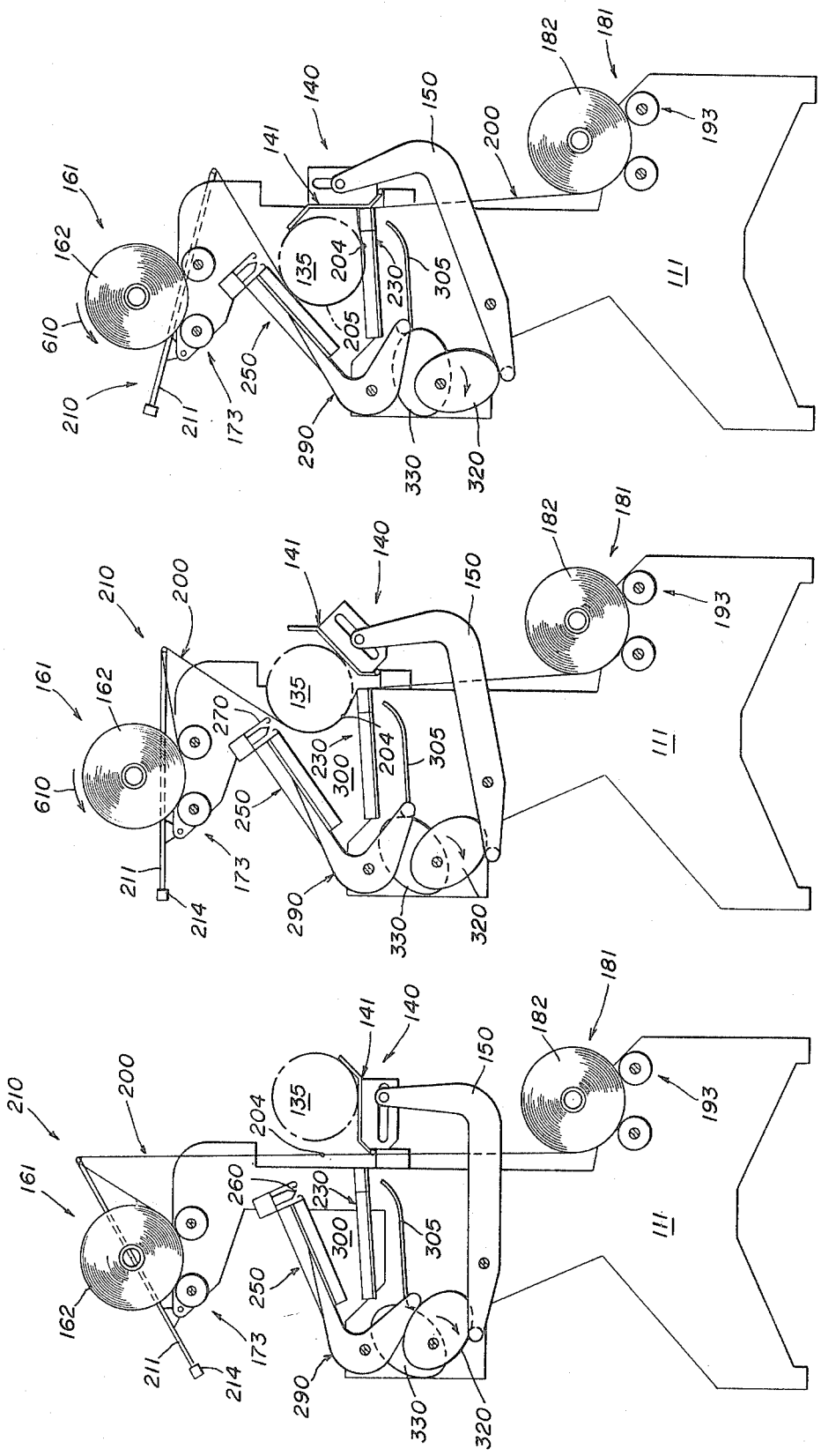

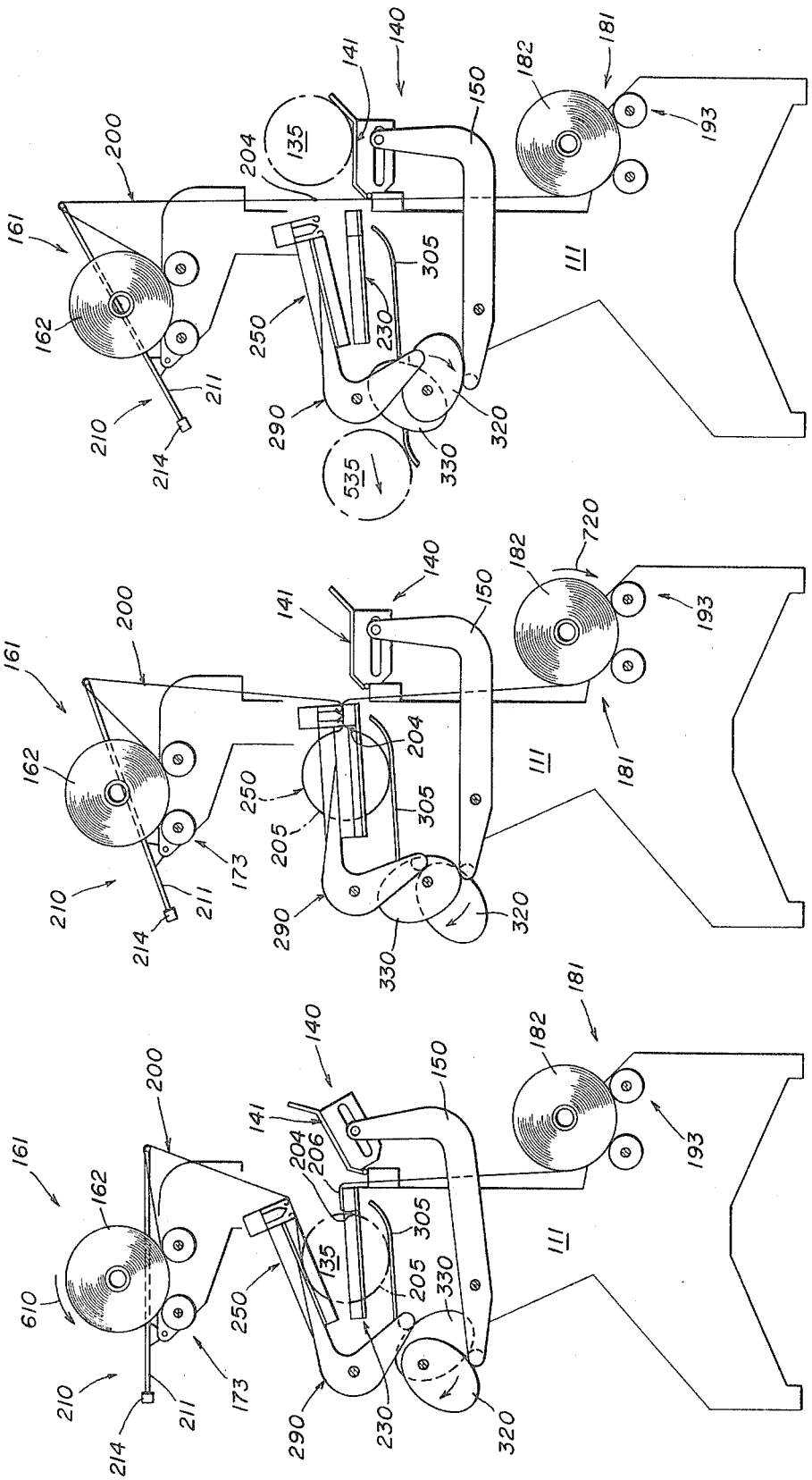

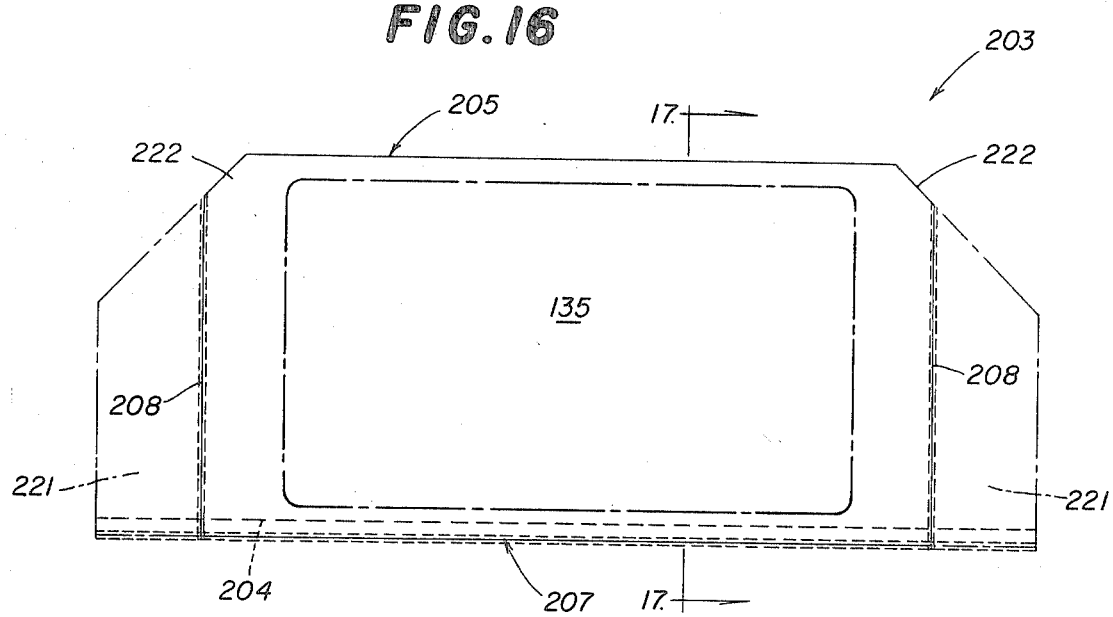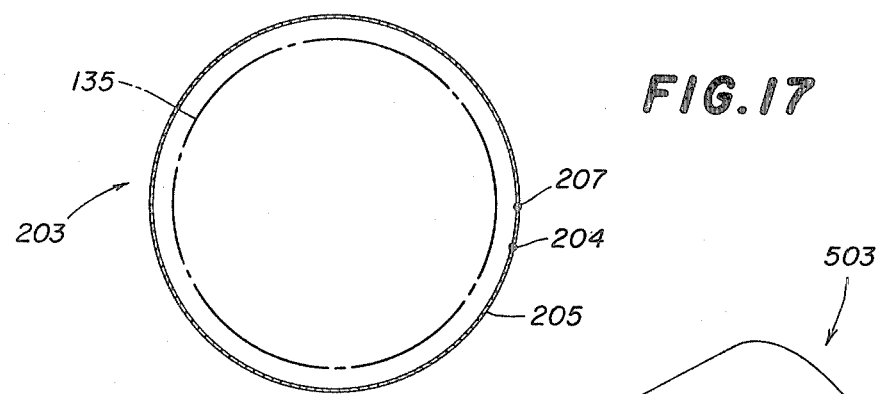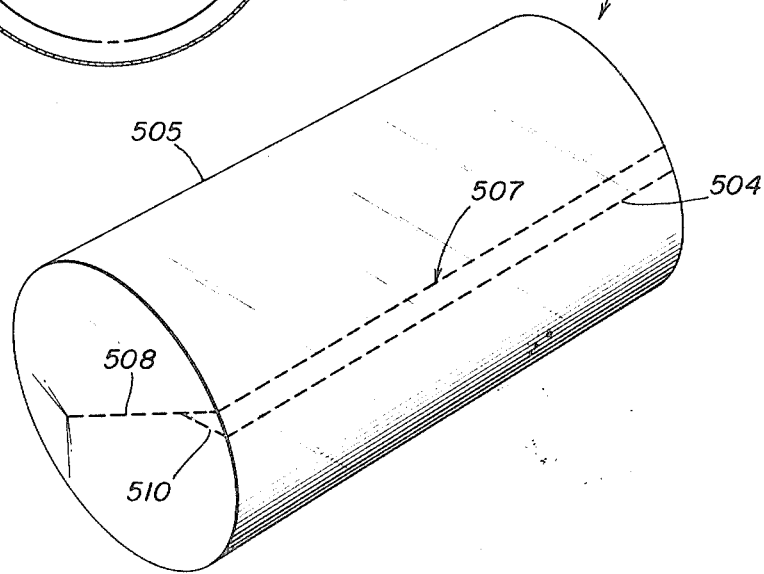

PACKAGING MACHINE AND METHOD AND ARTICLE PRODUCED THEREBY

The present invention relates to a machine and method for packaging a workpiece in a heat-sealable film to produce a package of the workpiece in a closed envelope of the heat-sealable film.

It is an important object of the present invention to provide a machine for packaging a workpiece in a heat-sealable film comprising a frame, a generally U-shaped sealing pad mounted on the frame and defining within the sealing pad a work area, means for establishing a longitudinal reach of film normally disposed adjacent to the sealing pad, a generally U-shaped heater mounted on the frame and shaped and arranged to overlie the sealing pad, means for urging a workpiece against the reach of film and into the work area to provide superimposed lengths of film positioned between the sealing pad and the heater and forming an envelope open along one side and the ends of the workpiece, drive mechanism providing relative movement of the heater and the sealing pad between a receiving position and a sealing-severing position, the sealing pad and the heater in the receiving position being spaced apart to receive a workpiece in the work area, the sealing pad and the heater in the sealing-severing position being juxtaposed to place the heater in contact with the superimposed lengths of film to seal and sever the same along the one side and the ends of the workpiece, thus to provide a package of a workpiece in a closed envelope of the heat-sealable film and to reestablish a longitudinal reach of film adjacent to the sealing pad.

Another object of the present invention is to provide a machine of the type set forth in which the generally U-shaped sealing pad is fixedly mounted on the frame and the generally U-shaped heater is shiftably mounted on the frame and movable between a receiving position in which the heater is spaced from the sealing pad to receive a workpiece in the work area and a sealing-severing position in which the heater is juxtaposed with the sealing pad to place the heater in contact with the superimposed lengths of film to seal and sever the same along the one side and the ends of the workpiece.

A further object of the present invention is to provide a machine of the type set forth in which the generally U-shaped sealing pad mounted on the frame is shaped to provide a central U-shaped trough therein such that when the heater and the sealing pad are in the sealing-severing position thereof, they are juxtaposed to place the heater in the trough and in contact with the superimposed lengths of film to seal and sever the same along the one side and the ends of the workpiece.

Another object of the present invention is to provide a machine of the type set forth in which a film guide is mounted on the frame adjacent to the heater and positioned normally to hold the film adjacent to but out of contact with the heater, the guide being movable between a receiving position and a sealing-severing position, the guide and the sealing pad cooperating in the sealing-severing positions thereof to provide superimposed lengths of film positioned between the heater and the sealing pad and forming an envelope open along one side and the ends of the workpiece.

A still further object of the present invention is to provide a machine of the type set forth in which the generally U-shaped sealing pad includes two spaced-apart generally parallel legs and a bight interconnecting the legs and extending therebeyond, the bight and the legs defining a work area therebetween, and in which the generally U-shaped heater includes two spaced-apart generally parallel legs and a bight interconnecting the legs and extending therebeyond, the legs and the bight of the heater being shaped and arranged to overlie the pad legs and the pad bight respectively, the reach of film normally disposed adjacent to the sealing pad having a width no greater than the length of the bight with a seam extending transversely of the longitudinal reach of film.

Another object of the present invention is to provide a machine of the type set forth in which a supply mechanism is mounted on the frame for rotatably supporting a roll of heat-sealable film to provide the longitudinal reach of film normally disposed adjacent to the sealing pad.

Another object of the present invention is to provide a machine of the type set forth in which film from the roll of film rotatably supported by the supply mechanism is withdrawn from the roll by movement of the heater and the sealing pad toward one another to supply film to the longitudinal reach of film and to the envelope.

A further object of the invention is to provide a machine of the type set forth in which a tension mechanism is mounted in the frame for maintaining the reach of film taut and to maintain the superimposed lengths of film positioned between the sealing pad and the heater taut.

A still further object of the present invention is to provide a machine of the type set forth in which a first film supply mechanism is mounted on the frame for rotatably supporting a first roll of heat-sealable film and a second film supply mechanism is mounted on the frame spaced apart from the first supply mechanism for rotatably supporting second roll of heat-sealable film to provide a longitudinal reach of film normally disposed adjacent to the sealing pad, the first and second rolls of film being joined at a seam extending transversely from the reach of film adjacent to the sealing pad and the film forming the envelope being withdrawn from the rolls of film on the first and second supply mechanisms.

Another object of the present invention is to provide a machine of the type set forth in which the film for forming the envelope is withdrawn from the first roll of film during movement of the heater and the sealing pad to the sealing-severing position and film is withdrawn from the second roll to supply a small amount of the film to the reach of film when the heater and the sealing pad are in the sealing-severing position for indexing the same with respect to the sealing pad.

Another object of the preset invention is to provide a machine of the type set forth in which a feed platform is mounted on the frame and is shiftable between a workpiece-receiving position and a workpiece-delivery position, the feed platform in the workpiece-delivery position urging the workpiece against the reach of film and into the work area to provide superimposed lengths of film for forming the envelope open along one side and the ends of the workpiece and the feed platform in the workpiece-receiving position being disposed adjacent to the sealing pad in position to receive a workpiece thereon.

A still further object of the present invention is to provide a machine of the type set forth in which a chute is positioned below the work area to receive a workpiece thereon and extends to a discharge point.

Another object of the present invention is to provide a machine of the type set forth in which the workpiece that is packaged in a closed envelope of the heat-sealable film exits from the machine along the chute to a shrink tank in which the heat-sealable film is heated to a temperature less than the melting point of the heat-sealable film to relieve stress in the film and provide a relatively smooth surface for the heat-sealable film.

A still further object of the prevent invention is to provide an article of manufacture including a completely enclosed roll of heat-sealable film generally in the same shape as the outer surface of the roll, the film having a U-shaped first seam extending at least along one end and the longitudinal side of the roll, the U-shaped first seam having two parallel legs and a bight interconnecting the legs and a second seam in the film adjacent to the first seam and interconnecting the legs of the first seam.

A still further object of the present invention is to provide an improved film supply mechanism which ensures proper feeding of the film from rolls thereof throughout the entire diameters of the rolls.

A still further object of the present invention is to provide a method for packaging a clean an dry roll of toweling in a heat-sealable film in which the toweling is urged against a longitudinal reach of film to provide an envelope open along one side and the ends of the roll of toweling and heat-sealing the envelope along the open sides thereof to provide package of a roll of clean and dry toweling completely enclosed in an envelope heatlsealable film.

The invention, both as to its organization and method of operation, together with further objects and advantages thereof, will best be understood by reference to the following specification and drawings hereof as follows:

FIG. 4 is a view in horizontal section of the packaging machine taken along the line 4—4 of FIG. 3;

FIG. 5 is an enlarged view in section of the sealing pad and heater without the support assembly therefor shown in FIG. 3;

FIG. 6 is a view in section of the heater looking up from the bottom thereof taken along the line 6—6 of FIG. 5;

FIGS. 10 to 15 are sequential diagrammatic views of the operating steps of the packaging machine;

FIG. 16 is a plan view of a packaged workpiece as produced by the machine of FIGS. 1 to 15;

FIG. 17 is a view in cross section of the packaged workpiece shown in FIG. 16, taken along line 17—17;

FIG. 18 is a perspective view of the packaged workpiece after shrinking of the plastic envelope about the workpiece.

Figure 1:
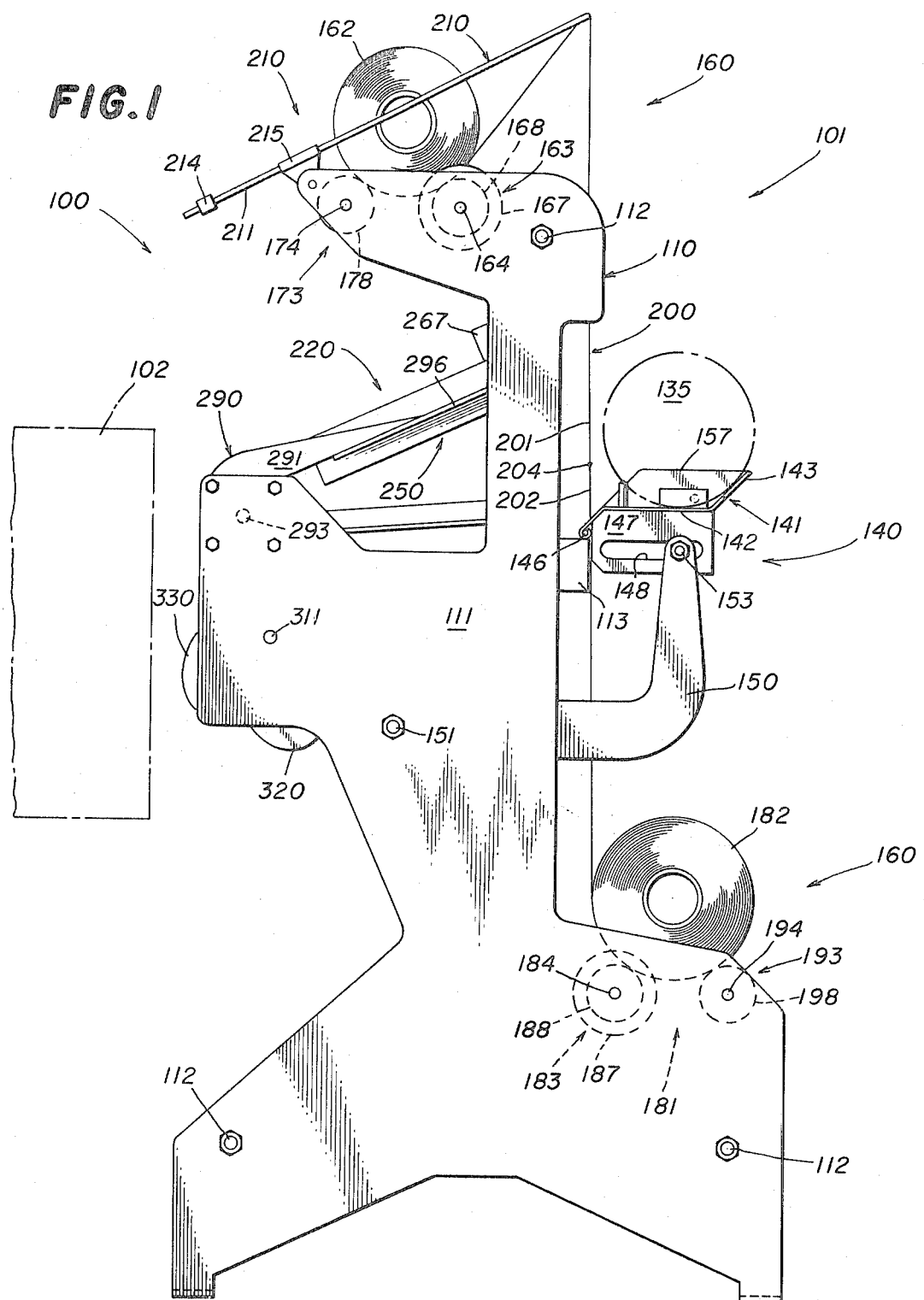
FIG. 1 is a side view in elevation of the packaging machine of the present invention.

Referring now to FIGS. 1 to 4, there is disclosed a packaging system 100 including a packaging machine 101 and a shrink tank 102, the packaging machine 101 having a frame 110 including air of parallel spaced-apart upstanding panels 111 interconnected by a plurality of tie rods 112 and having a feed-platform support 113 mounted on one of the side panels 111.

Figure 2:
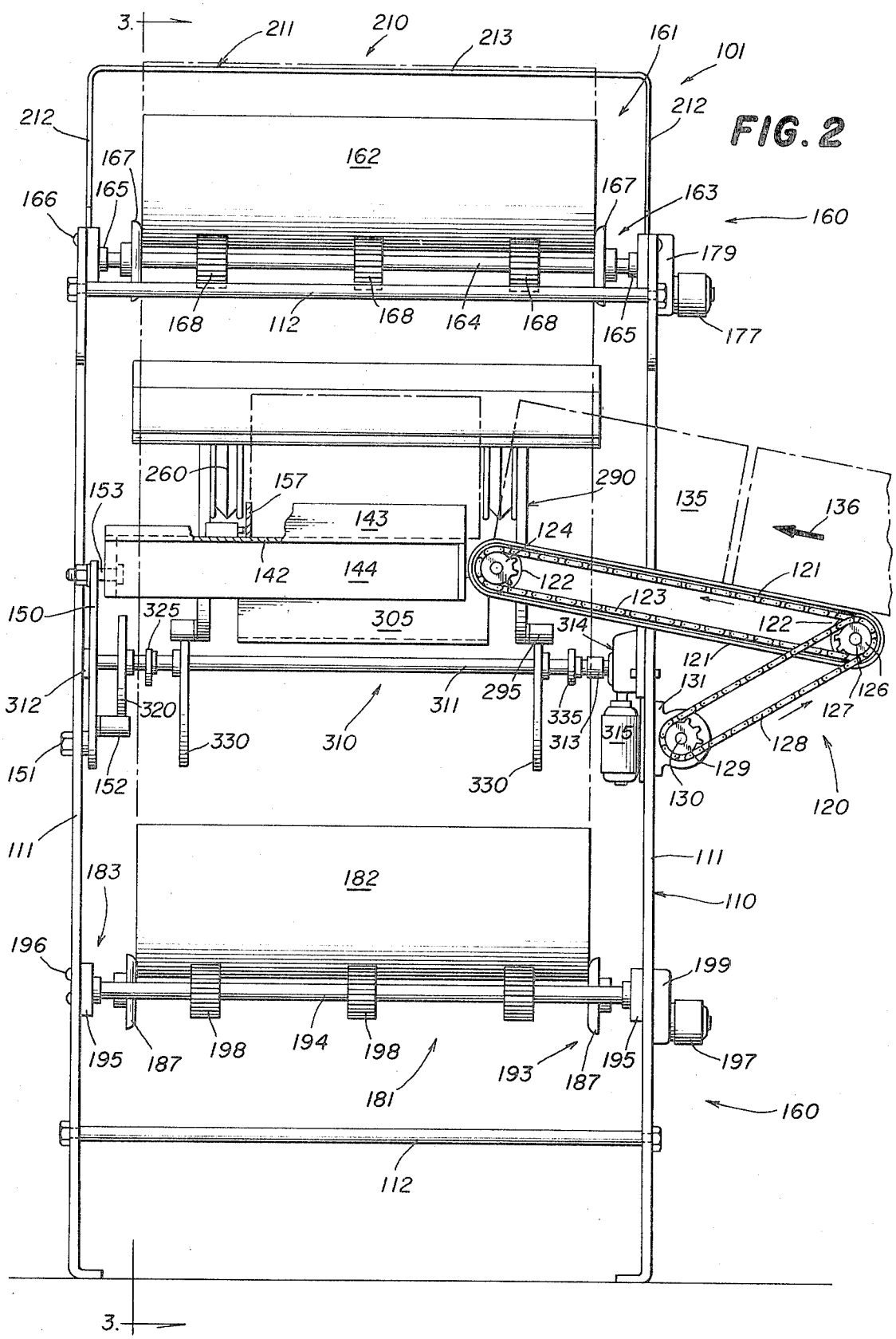
FIG. 2 is a front view in elevation of the packaging machine of FIG. 1.

As shown particularly in FIGS. 2 and 4, an infeed conveyor 120 is provided on the machine 101 to the right in FIG. 2 and includes an endless belt 121 supported at either end by rollers 122 which are connected by an idler chain 123 meshing at one end with an idler gear 124 mounted on an idler shaft 125 and meshing at the other end with a gear 126 mounted on a gear shaft 127. Also mounted on the gear shaft 127 on a gear (not shown) is a drive chain 128 which is supported at its other end by drive gear 129 mounted on a drive shaft 130 of motor 131. There is also provided on either side of the infeed conveyor 120 a front retaining wall 132 and a rear retaining wall 133 on either side of the endless belt 121 and spaced apart a distance greater than the width of a workpiece 135 which rides on the endless belt 121 in a direction shown by arrow 136.

The workpiece 135 is transported by the infeed conveyor 120 to the feed-transport mechanism 140 which includes a feed platform 141 having baseplate 142 connected to an outwardly inclined rear support plate 143 and an inwardly inclined front support plate 144 which terminates at one edge in an inwardly turned flange 145 that holds pin 146. There is also connected to baseplate 142 a downwardly depending flange 147 having a elongated slot 148 therein.

Cooperating with the feed platform 141 and, more particularly elongated slot 148 in the downwardly depending flange 147, is an L-shaped feed actuator arm 150 pivotally mounted on side panel 111 with shaft 151 and having a cam follower 152 at the long end of the "L" and a bolt 153 disposed in elongated slot 148 and nut 154 connected to the bolt 153 to maintain the connection between the feed actuator arm 150 and the feed platform 141. The workpiece 135 will be moved in the direction shown by arrow 156 upon movement of the feed platform 141 in response to movement of the feed actuator arm 150. Movement of the workpiece 135 off the feed platform 141 is prevented by an upstanding plate 157 pivotally connected to a hinge 158 and by the outwardly inclined rear support plate 143.

A film supply mechanism 160 of the packaging machine 101 includes an upper film supply 161 containing an upper film roll 162 and an upper film supply drive roll 163 which has an upper drive shaft 164 journaled in a pair of upper drive shaft flange bearings 165 connected to the side panels 111 by a plurality of bolts 166. A pair of upper guide flanges 167, mounted on shaft 164, are spaced apart a distance greater than the length of roll 162 to prevent movement of the upper film roll 162 longitudinally of the upper film drive roll 163. A plurality of knurled rubber heels 168, fixedly mounted on the upper drive shaft 164, provide for nonslip rotation of the upper film roll 162 with rotation of the rubber wheels 168. There is also provided in the upper film supply 161 an upper supply idler roll 173 located rearward of the upper film drive roll 163 and including an upper idler shaft 174 journaled to the upstanding side panels 111 as hereinbefore described with respect to the upper film drive roll 163. The upper idler shaft 174 has fixedly mounted thereon a plurality of spaced-apart knurled rubber wheels 178. The upper idler shaft 174 may also have mounted thereon a plurality of flanges in addition to or in lieu of the flanges 167 on the drive shaft 164. The shaft 164 is connected to an upper drive motor 177 mounted on frame 110 by motor mounting plate 179.

The film supply mechanism 160 also includes a lower film supply 81 having a lower film roll 182 and a lower film drive roll 183. The lower film drive roll 183 includes a lower drive shaft 184 having mounted thereon a pair of lower guide flanges 187 spaced apart a distance greater than the length of the lower film roll 182 to prevent movement of the roll 182 longitudinally along the lower film drive roll 183. Also disposed on the lower film drive shaft 184 are a plurality of spaced-apart knurled rubber wheels 188. The lower film supply 181 also includes a lower film idler roll 193 having a lower idler shaft 194 journaled in a pair of lower idler flange bearings 195 mounted on the side panels 111 by a plurality of bolts 196. The lower drive shaft 184 is driven by a lower drive motor 197 mounted on the frame 110 by a motor mounting plate 199 and slippage of the lower film roll 182 is prevented by a plurality of spaced-apart knurled rubber wheels 198 mounted on the lower idler shaft 194. The lower idler shaft 194 may have mounted thereon a plurality of flanges in addition to or in lieu of the flanges 187 mounted on the drive shaft 184.

As clearly seen in the drawings, a reach of film 200 is established between the upper film roll 162 and the lower film roll 182 and is comprised of an upper portion 201 from the upper film roll 162 and a lower portion 202 from the lower film roll 182 meeting at a seam 204 which extends transversely of the longitudinal reach of film 200. As will be later explained, film from the upper film roll 162 and the lower film roll 182 is fed by the upper film drive roll 163 and the lower film drive roll 183 to form a loose envelope 205 around the workpiece 135 and to provide lengths of film 206 connecting the envelope 205 and the reach of film 200. During the sealing and severing of the lengths of film 206, a seam 207 is formed to close the envelope 205 and new seam 204 is formed to reestablish the reach 200.

Figure 3:
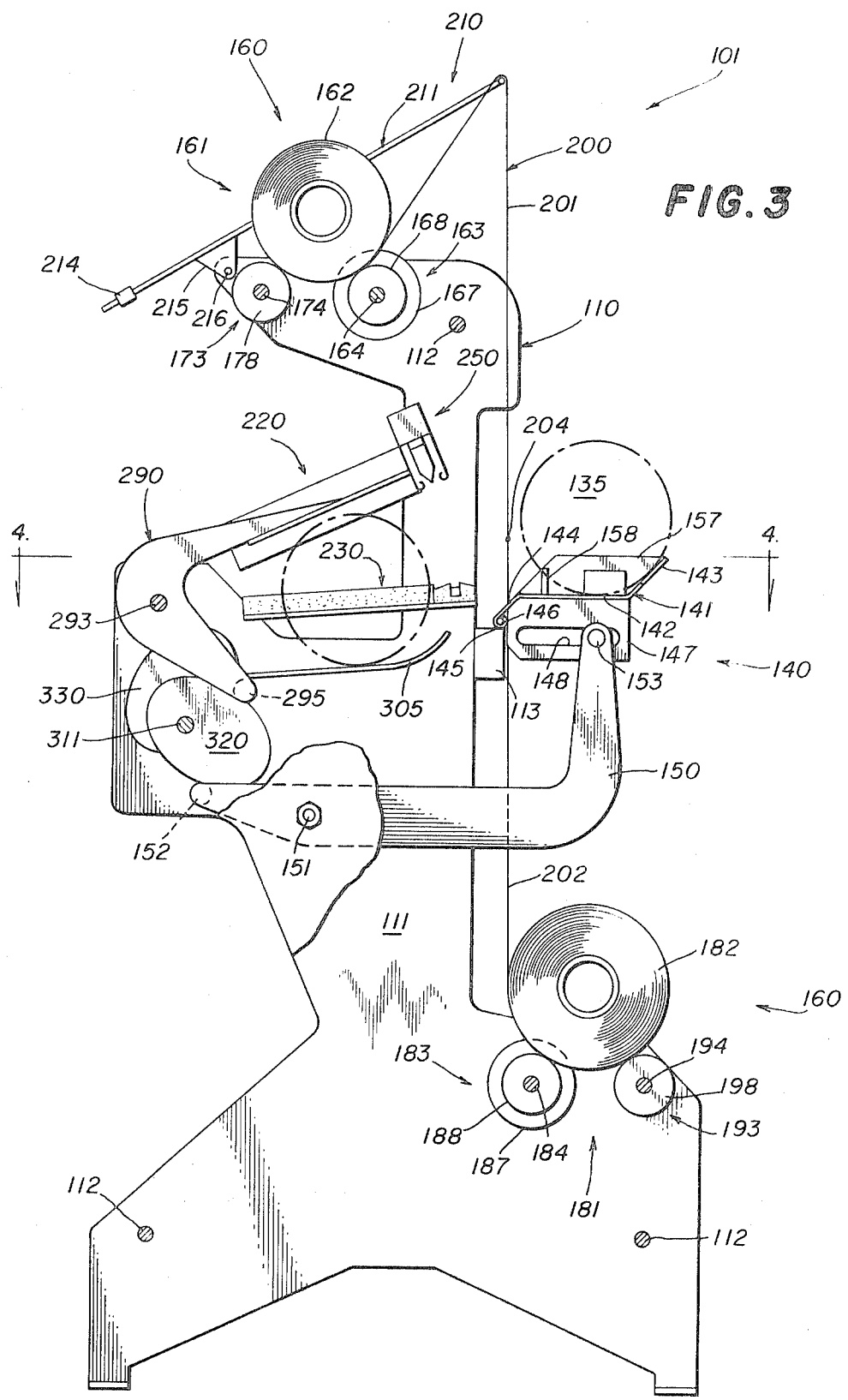
FIG. 3 is a view in vertical section of the packaging machine taken along the line 3—3 of FIG. 2.

The longitudinal reach of film 200 is maintained taut by tensioning mechanism 210 including a U-shaped bracket 211 having parallel spaced-apart legs 212 and a bight 213 interconnecting the legs 212. Parallel to the bight 213 and spaced therefrom is a weight 214 interconnecting the legs 212 and extending therebeyond. The U-shaped bracket 211 is mounted on the frame 110 by a pair of triangularly shaped sleeve supports 215 pivotally mounted to the upstanding side panels 111 by pins 216. As seen in FIG. 3, the upper portion 201 of the reach of film 200 is fed from the bottom of the upper film roll 162 over the bight 213 of the U-shaped bracket 211 and then downwardly to meet the lower portion 202 at the seam 204 of the reach of film 200.

The seam 204 is normally disposed adjacent to a sealing and severing mechanism 220 which includes a jaw frame 225 formed in part of a U-shaped sealing pad 230. The pad 230 includes a pair of parallel spaced-apart legs 231 interconnected by a bight 232 having outwardly extending portions 233. As seen more particularly in FIGS. 7 and 8, the U-shaped sealing pad 230 includes a U-shaped base plate 234 having mounted thereon a pair of spaced-apart yieldable pads 235 having downwardly and outwardly sloping top surfaces 236 and on the interior faces 237 of yieldable pads 235 there are provided offset surfaces 238.

Between the yieldable pads 235 is positioned a U-shaped cooling tube 240 supported by offset surfaces 238 of pads 235 and mounted on the U-shaped base plate 234 by a plurality of support poles 241 and fixed thereby by a plurality of nuts 242. As seen most clearly in FIG. 4, a pair of cooling supply pipes 243 and pair of cooling exit pipes 244 provide a cooling flow path through the cooling tube 240 as shown by the directional arrows 245 and 246 for the coolant 247 to flow. The interior faces 237 of the yieldable pads 235 and the cooling tube 240 define trough 249.

The flange 225 further includes a U-shaped heater 250 having a pair of parallel spaced-apart legs 251 interconnected by a bight 252 having portions 253 extending outwardly of the legs 251. As is most clearly seen in FIGS. 5-7, U-shaped heater 250 is formed of a U-shaped cap 254 having mounted thereon and depending therefrom a heat-transfer base 255 by bolts 256, the heat-transfer base 255 having therein at the top thereof a triangular groove 257. The heat-transfer base 255 includes a pair of parallel straight wall portions 258 and a pair of inwardly inclined wall portions 259 meeting and terminating in a generally V-shaped knife edge 260. At one end of the legs 251 there are provided inwardly inclined surfaces 259a and 259b to assure that the knife edges 260 on the legs 251 meet the knife edge 260 on the bight 252. Positioned in the triangular groove 257 in the heat-transfer base 255 is a heating element 265 and also located in the heat-transfer base 255 and spaced from the heating element 265 is a temperature sensor 266. Coextensive with the bight 252 of the U-shaped heater 250 is a weight 267 mounted on top of the U-shaped cap 254.

Figure 8:
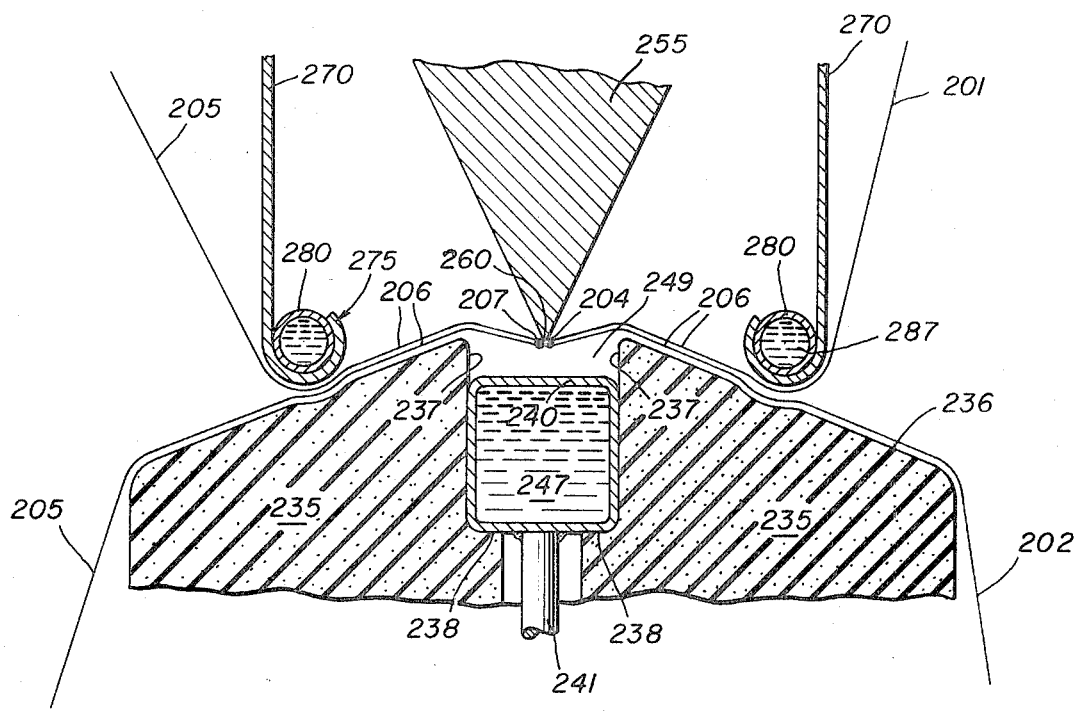
FIG. 8 is an enlarged view in vertical section of a portion of the heater and the sealing pad shown in FIG. 7.

There is also provided a pair of U-shaped guides 270 mounted by bolts 271 to the U-shaped cap 254 and separated therefrom by heat insulators 272. The lowest most portions of guides 270 are inwardly turned to form flanges 275 which hold therein a generally U-shaped cooling tube 280. As seen in FIG. 6, the cooling tube 280 is continuous and is connected to a coolant supply pipe 283 and a coolant exit pipe 284 to provide a coolant flow path, as seen by directional arrows 285 and 286, for the coolant 287 that is carried within the cooling tube 280, as shown in FIG. 8.

The generally U-shaped heater 250 is mounted on the frame 110 as hereinafter described. A pair of boomerang-shaped arms 290 having an upper portion 291 and a lower portion 292 are fixedly mounted on two separately overhung pivot shafts 293 which are journaled in a pair of flange bearings 294 mounted on the side panels 111. At the ends of the lower portions 292 of the boomerang-shaped arms 290 are provided two cam followers 295, the purpose of which will be hereinafter explained, and at the ends of the upper portions 291 of the boomerang-shaped arms 290 are mounted braces 296 by bolts 297. Onto the braces 296 are mounted the U-shaped heaters 250 by means of a plurality of L-shaped brackets 298 mounted on the braces 296 by a plurality of bolts 299 and mounted on the heater 250 by a plurality of bolts 271.

As seen in FIGS. 3 and 4, the U-shaped sealing pad 230 defines therewithin a work area 300 and positioned below the work area 300 and the sealing pad 230 is chute 305 leading from the packaging machine 101 to the shrink tank 102.

Figure 9:
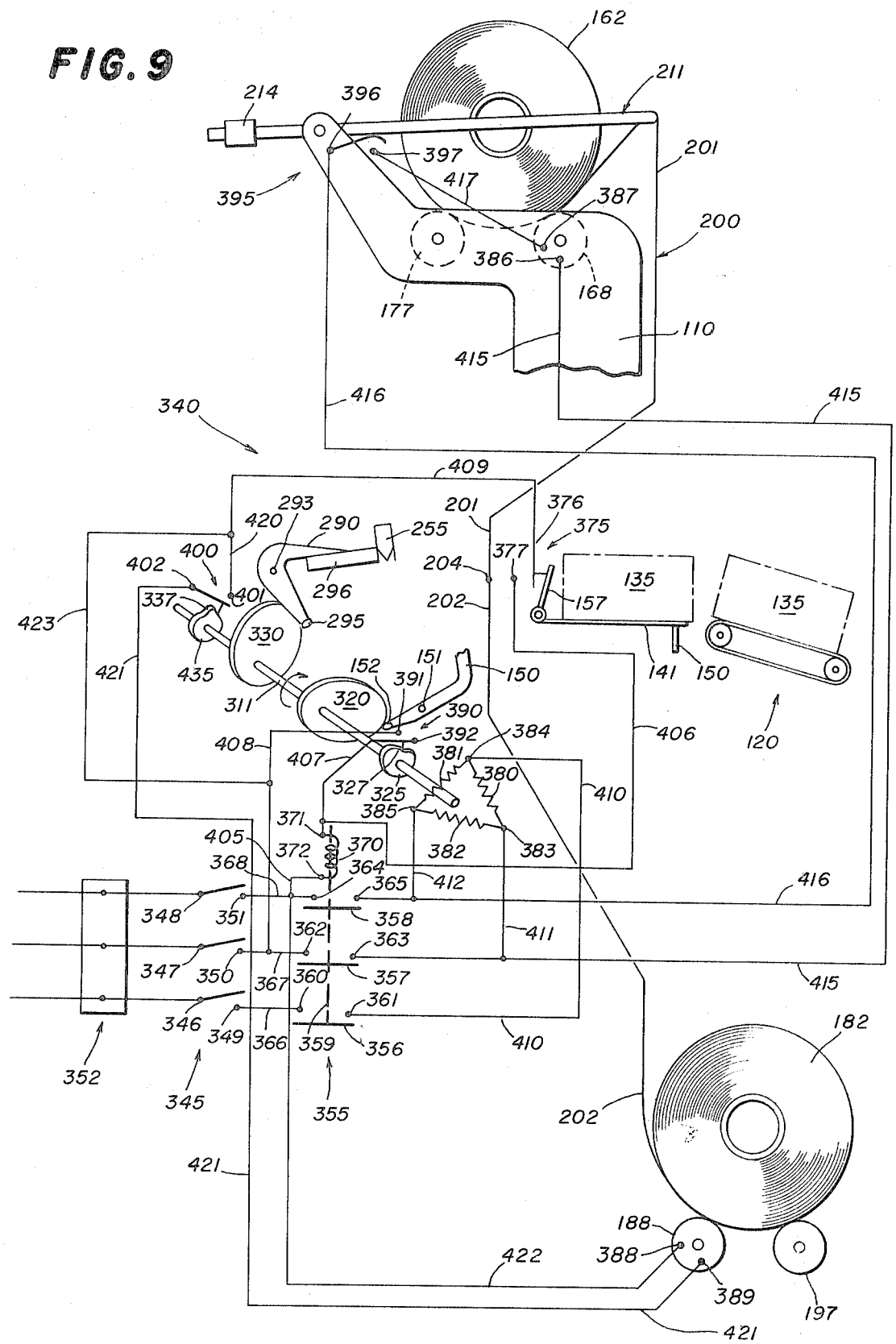
FIG. 9 is a diagrammatic and schematic view of the control mechanism of the packaging machine and certain components thereof.

Drive mechanism 310 is provided for the feed-transport mechanism 140 and the sealing and severing mechanism 220 and includes a main camshaft 311 journaled at one end, as shown in FIGS. 2 and 4, in a flange bearing 312 mounted on one of the upstanding side panels 111. The other end of the main camshaft 311 is journaled in a rigid coupling 313 which is connected to a drive shaft (not shown) of a right-angle, three-phase gear-head motor 315 mounted on the frame 110 by motor mount 314. From the left-hand side of the main camshaft 311, as shown in FIG. 2, there is provided a feed actuator arm cam 320, mounted on the camshaft 311 by mounting flange 321, in contact with the cam follower 152 on the longer portion of the L-shaped feed actuator arm 150. Spaced from the feed actuator arm cam 320 is cycle shutoff cam 325 mounted on the main camshaft 311 by mounting flange 326 and, as shown in FIG. 9, the cycle shutoff cam 235 has a small indent 327 in the periphery thereof. A pair of spaced-apart jaw-frame cams 330 are mounted on the main camshaft 311 by mounting flanges 331 and contact the cam followers 295 on the boomerang-shaped arms 290. Adjacent to the rigid coupling 313 is a lower film drive cam 335 mounted on the main camshaft 311 by a mounting flange 336, and as shown in FIG. 9, the lower film drive cam 335 has a short rise portion 337 on the periphery thereof.

The electrical system 340 controlling the movement of the feed-transport mechanism 140, the film-supply mechanism 160 and the sealing and severing mechanism 220 will now be described. As shown in FIG. 9, a three-contact switch 345 has one set of three terminals 346, 347 and 348 connected to a three-line power supply 352 having inputs L-1, L-2 and L-3 and the switch 345 has the other set of three terminals 349, 350 and 351 connected to terminals 360, 362 and 364 respectively of motor start relay 355 by conductors 366, 367 and 368. The motor start relay 355 has three normally open contacts 356, 357 and 358 which upon energization of the motor start relay 355 are pulled up to make electrical contact between the aforementioned terminals 360, 362 and 364 and terminals 361, 363 and 365 of the relay 355. The motor start relay 355 also includes a coil 370 having an upper terminal 371 and a lower terminal 372 and a core 359, both of which act in the usual manner.

There is provided on the feed platform 141 adjacent to the upstanding plate 157 a normally open microswitch 375 which is closed by the movement of a workpiece 135 against the upstanding plate 157 pivotally mounted on the hinge 158. The microswitch 375 has terminals 376 and 377, connected as will hereinafter be described.

The right-angle, three-phase, gear-head motor 315 has three field coils 380, 381 and 382 interconnected to terminals 383, 384 and 385. The upper drive motor 177 has terminals 386 and 387 and the lower drive motor 197 has terminals 388 and 389.

Adjacent to the cycle shutoff cam 325 is a normally open microswitch 390 having a pair of terminals 391 and 392. Adjacent to the U-shaped bracket 211 of the tensioning mechanism 210 is a normally open microswitch 395 having a pair of terminals 396 and 397 for control of the upper drive motor 177. Adjacent to the lower film drive cam 335 is a normally open microswitch 400 having a pair of terminals 401 and 402 for control of the lower film drive motor 197.

The circuitry of the aforementioned electrical components will be hereinafter described. The terminal 372 of the coil 370 in the motor start relay 355 is connected to the terminal 351 of the switch 345 by a conductor 405 and the conductor 368. The terminals 371 of the coil 370 is connected to the terminal 377 of the microswitch 375 by a conductor 406 and a conductor 407. The terminal 371 of the coil 370 is connected to the terminal 392 of the switch 390 by the conductor 407. The terminal 391 of the microswitch 390 is connected to the terminal 350 of the switch 345 by a conductor 408 and the conductor 367. The terminal 376 of the microswitch 375 is connected to the terminal 350 of the switch 345 by a conductor 409, a conductor 423 and the conductors 408 and 367.

The terminal 384 of the gear-head motor 315 is connected to the terminal 361 of the motor start relay 355 by a conductor 410, the terminal 383 of the motor 315 is connected to the terminal 363 of the relay 355 by a conductor 411 and a conductor 416 and the terminal 385 of the motor 315 is connected to the terminal 365 of the relay 355 by a conductor 412 and a conductor 416.

The terminal 363 of the motor start relay 355 is connected to the terminal 386 of the upper drive motor 177 by a conductor 415, the terminal 365 of the motor start relay 355 is connected to the terminal 386 of the microswitch 395 by a conductor 416 and the terminal 397 of microswitch 395 is connected to the terminal 387 of the upper drive motor 177 by a conductor 417.

The terminal 401 of the microswitch 400 is connected to the terminal 350 of the switch 345 by a conductor 420 and the conductors 423 and 408, the terminal 402 of the microswitch 400 is connected to the terminal 389 of the lower drive motor 197 by a conductor 421 and the terminal 388 of the lower drive motor 197 is connected to the terminal 351 of the switch 345 by a conductor 422.

The operation of the packaging machine 101 will be described with particular reference to FIGS. 9-15. FIG. 10 shows the packaging machine 101 in its neutral position in which the feed-transport mechanism 140 is in a workpiece-receiving position and the sealing and severing mechanism 220 is in a neutral position. During the time that the packaging machine 101 is in its neutral position the coolant 247 is supplied to the coolant tube 240, the coolant 287 is supplied to the coolant tube 280 and the heating element 265 is activated to provide heat to the heat-transfer base 255 and hence to the knife edge 260. The tensioning mechanism 210 is in its film-storage position maintaining the reach of film 200 taut; therefore, the microswitch 395 controlling the upper drive motor 177 is open.

The three-contact switch 345 is then closed to electrically connect the power supply 352 with the terminal 376 of the normally open microswitch 375 as hereinbefore explained, and the other terminal 377 of the normally open microswitch 375 is electrically connected to the terminal 371 of the coil 370 in the motor start relay 355. As seen from FIG. 9, until the normally open microswitch 375 is closed, the packaging machine 101 is not activated regardless of the closing of the three-contact switch 345.

A workpiece 135 is fed onto the feed platform 141 by means of the infeed conveyor 120 to contact the upstanding plate 157 pivotally mounted on hinge 158 to move the plate 157 and close the normally open microswitch 375. The closing of the microswitch 375 energizes the motor start relay 355 and pulls up the contacts 356, 357 and 358 thereof and energizes the field coils 380, 381 and 382 of the gear-head motor 315 which provides clockwise rotation of the main gearshaft 311 and clockwise rotation of the cams 320, 325, 330 and 335.

As seen in FIG. 11, as the main camshaft 311 rotates, the feed actuator arm cam 320 and the jaw-frame cams 330 rotate therewith to provide movement of the feed platform 141 to its workpiece-delivery position and the sealing and severing mechanism 220 to a receiving position in which the U-shaped heater 250 is spaced from the U-shaped sealing pad 230 to receive the workpiece 135 in the work area 300 and onto the chute 305. The feed platform 141 in its workpiece-delivery position urges the workpiece against the taut reach of film 200 to initiate the formation of the envelope 205. The urging of the workpiece 135 against the taut reach of film 200 by the feed platform 141 results in movement of the tensioning mechanism 210 from its film-storage position to its film-feeding position in which the normally open microswitch 395 is closed by movement of the U-shaped bracket 211 to activate the upper drive motor 177 and to cause rotation of the upper film roll 162, as shown by directional arrow 610, to feed film therefrom to the reach of film 200 to provide film for the formation of the envelope 205.

Rotation of the main camshaft 311 also results in the closing of the normally open microswitch 290 due to the rotation of the cycle shutoff cam 325. Since the cycle shutoff cam 325 has a small indent 327 in the periphery thereof, a slight rotation of the main camshaft 311 results in the closing of the normally open microswitch 390. When the normally open microswitch 390 is closed, a holding circuit for the motor start relay 355 is activated to maintain the relay 355 in its closed position during the cycle of the packaging machine 101. When the workpiece 135 leaves the feed platform 141, the normally open microswitch 375 returns to its open position and but for the cycle shutoff cam 325, the gear-head motor 315 would shut off. As best seen in FIG. 9, the cycle shutoff cam 325 maintains the motor start relay 355 in its closed condition for a majority of the rotation of the main gearshaft 311. When the tensioning mechanism 210 assumes its film-feeding position, film from the upper film roll 162 is positively fed therefrom. The microswitch 395 is normally open due to the biasing of the tensioning mechanisms 210 by weight 214 but is closed when the workpiece 135 is urged against the reach of film 200.

Reference to FIGS. 12 and 13 shows that film from the upper film roll 162 is withdrawn from the roll 162 during the formation of the envelope 205 which is open along the length an both ends of the workpiece 135 and the withdrawal of film from the upper film roll 162 also provides the superimposed lengths of film 206 positioned over the yieldable pads 235 of the U-shaped sealing pad 230. During the time that the feed platform 141 is shifted to its workpiece-delivery position and shifted therefrom and during the time the the U-shaped heater 250 is shifted from the receiving position to the sealing-severing position, as shown in FIG. 14, the electrical connections remain the same as hereinabove described with reference to FIG. 11.

As seen in FIG. 14, when the U-shaped heater 250 has shifted to the sealing-severing position, the tensioning mechanism 210 has returned to its film-storage position thereby opening the microswitch 395 which stops the upper film drive motor 177 and halts the rotation of the upper film roll 162 and the feeding of film therefrom. The normally open microswitch 400 is closed by rotation of the lower film drive cam 335 which activates lower drive motor 197 and results in rotation of the lower film roll 182 to supply a small amount of film to the reach of film 200 and indexes the seam 204 for a purpose hereinafter to be explained.

Figure 7:
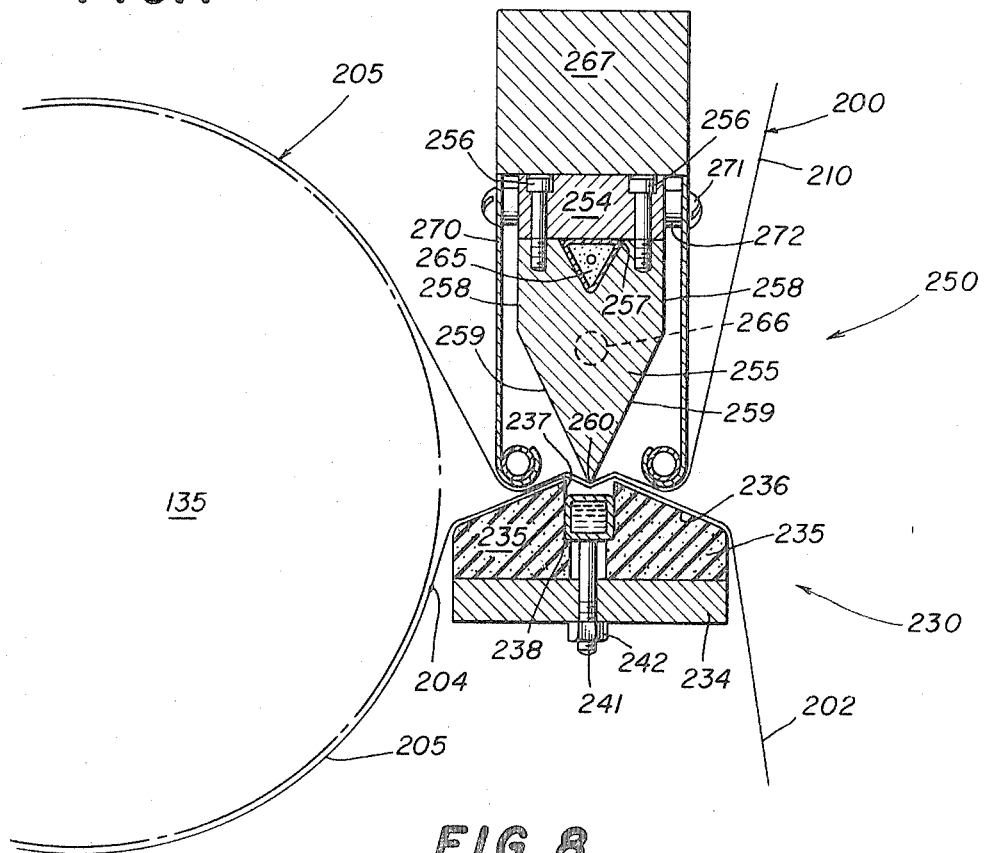
FIG. 7 is a view in vertical section of the heater and the sealing pad shown in FIG. 5.

As best seen in FIGS. 7 and 8, the U-shaped sealing pad 230 and the U-shaped heater 250 in their sealing-severing position are arranged so that the inwardly turned flanges 275 of guides 270 hold the reaches of film 206 tautly against the top surfaces 236 of the yieldable pads 235 to maintain the lengths of film 206 taut during the sealing-severing thereof. The inwardly turned flanges 275 also hold down the reaches of film 206 for a short time after the sealing-severing thereof to allow the just-formed seams 204 and 207 to cool before tension is applied to them.

The yieldable pads 235 are in thermal contact with the coolant tube 280 and are cooled thereby. The cooperation of the coolant tubes 240 and 280 cools the lengths of film 206 adjacent thereto so as to prevent the melting thereof during the sealing-severing of the lengths of film 206. In the sealing-severing position, the knife edge 260 is in the trough 249 and contacts the superimposed lengths of film 206 and seals and severs the same along the three open sides of the envelope 205 to form a package 203 of the workpiece 135 in a closed loose envelope 205 of the heat-sealable film. As seen, the old seam 204 has been moved away from the knife edge 260 due to the indexing of the lower film roll 182 during a prior sealing-severing operation and an envelope seam 207 and a new seam 204 are formed in the lengths of film 206 during the sealing-severing thereof; the seam 207 closes the envelope 205 while the new seam 204 reestablishes the longitudinal reach of film 200.

As best seen in FIGS. 9 and 14, the lower drive motor 197 is actuated by the closing of microswitch 400 when the short rise 337 of the lower film drive cam 335 closes the switch 400 and completes the circuit between the terminals 388 and 389 of the lower film drive motor 197 and the power supply 352. Since the short rise 337 is very small, the microswitch 400 is closed during only a few degrees of rotation of the camshaft 311 and only about 1 inch of film is withdrawn from the lower film roll 182 and provided to the lower portion 202 to the reach of film 200. The indexing of the lower film roll 182 moves the seam 204 out of position to be contacted by the knife edge 260 and prevents the sealing and resealing of successive envelopes along the same seam. The short rise 337 of the lower film drive cam 335 and the small indent 327 of the cycle shutoff cam 325 are positioned to prevent operation of the lower drive motor 197 when the switch 345 is closed but the motor start relay 355 is open.

During the time that the U-shaped heater 250 and the U-shaped sealing pad 230 are in the sealing-severing position, the feed platform 141 has shifted to its workpiece-receiving position to receive a workpiece 135 from the infeed conveyor 120.

As best seen in FIGS. 9 to 15, after the sealing of the envelope 205, a package 203 of a workpiece 135 enclosed in a heat-sealable film exits from the packaging machine 101 along the chute 305 to a discharge point and into shrink tank 102 shown in FIG. 1. The packaging machine 101 has returned to the neutral position shown also in FIG. 10, in which the longitudinal reach of film 200 is reestablished disposed adjacent to the U-shaped sealing pad 230 and tautly maintained by the tensioning mechanism 210. If a workpiece 135 is not in position on the feed platform 141 to contact the upstanding plate 157 and thereby close the microswitch 375, the motor start relay 355 will open upon rotation of the cycle shutoff cam 325 to a position in which the small indent 227 on the periphery thereof allows the normally open microswitch 390 to open and deenergize the motor start relay 355. If a new workpiece 135 is in position on the feed platform 141 to close the microswitch 375, then the motor start relay 355 remains energized and the gear-head motor 315 continues to operate and rotate the main camshaft 311 to provide another cycle of the packaging machine 101 all as hereinbefore explained.

The package 203 is best illustrated in FIGS. 16 to 18 and includes a workpiece 135 enclosed in a loose envelope 205 sealed by a U-shaped seam 207. The U-shaped seam 207 includes a pair of parallel spaced-apart leg portions 208 and a bight portion interconnecting the leg portions 208. There also are illustrated waste film portions 221 at either end of the package 203, which portions 221 may be severed and discarded or left on to provide for easier opening of the package 203; a pair of tucks 222 occur where any excess film is gathered. Referring to FIG. 17, the position of the new seam 207 is spaced from the preceding seam 204, as previously explained with reference to FIGS. 8 and 14, such spacing being provided by the indexing of the lower film roll 182.

After the package 203 exits from the packaging machine 101 along the chute 305, the waste film portions 221 may or may not be trimmed and discharged prior to entry of the package 203 into the shrink tank 102. The shrink tank 102 is simply a container or oven maintained at a temperature between the flow point and the melting point of the film in order to relieve stresses incurred in the packaging of the workpiece 135 and to shrink the loose envelope 205 of film to form a package 503 consisting of the workpiece 135 in a closed envelope 505 tightly wrapped around the workpiece 135 and having in the envelope 505 a U-shaped first seam 507 including two spaced-apart leg portions 508 extending along the ends of the workpiece 135 and a bight portion interconnecting the leg portions 508 and extending along the longitudinal side of the workpiece 135. The envelope 505 also has a second seam 504 adjacent to and generally parallel to the bight portion of the first seam 507 and interconnecting the leg portions 508 of the first seam 507 with portions 510 of the second seam 504. It will be appreciated that the seams 504–510, 507 and 508 are derived respectively from the seams 204, 207 and 208 by shrinkage thereof.

In a constructional example, the packaging machine 101 is about 62 inches high and the side panels 111 are flame cut from ⅜-inch thick steel plates. The workpiece 135 is a roll of clean and dry toweling and the heat-sealable film is a polyethylene resin. The coolant tubes 240 and 280 are copper and the coolant is water. In the sealing-severing position, the bottom edges of flanges 275 are one-sixteenth of an inch below the knife edge 260. The weight 267 is steel while the cap 254 and the heat-transfer base 255 are aluminum and the yieldable pads 235 are sponge rubber.

The jaw-frame cams 330 are designed so that about 90° of the rotation represents the low dwell during which the sealing-severing takes place and approximately 60° represents the cam rise. About 110° of the high dwell keeps the jaw frame 225 open to allow film from the upper film roll 162 to be withdrawn and form the envelope 205. Since the jaw frame 225 is raised upward by the cams 330 and drops by gravity, there is an inherent safety feature as any object inadvertently placed between the U-shaped sealing pad 230 and the heater 250 will automatically maintain the jaw frame 225 in an open position without interfering with the rotation of the main cam shaft 311.

The heating element 265 is maintained at 725° F. to prevent contamination of the heat-transfer base 255 and the shrink tank 102 is maintained at a temperature of about 250° F.

Figure 19:
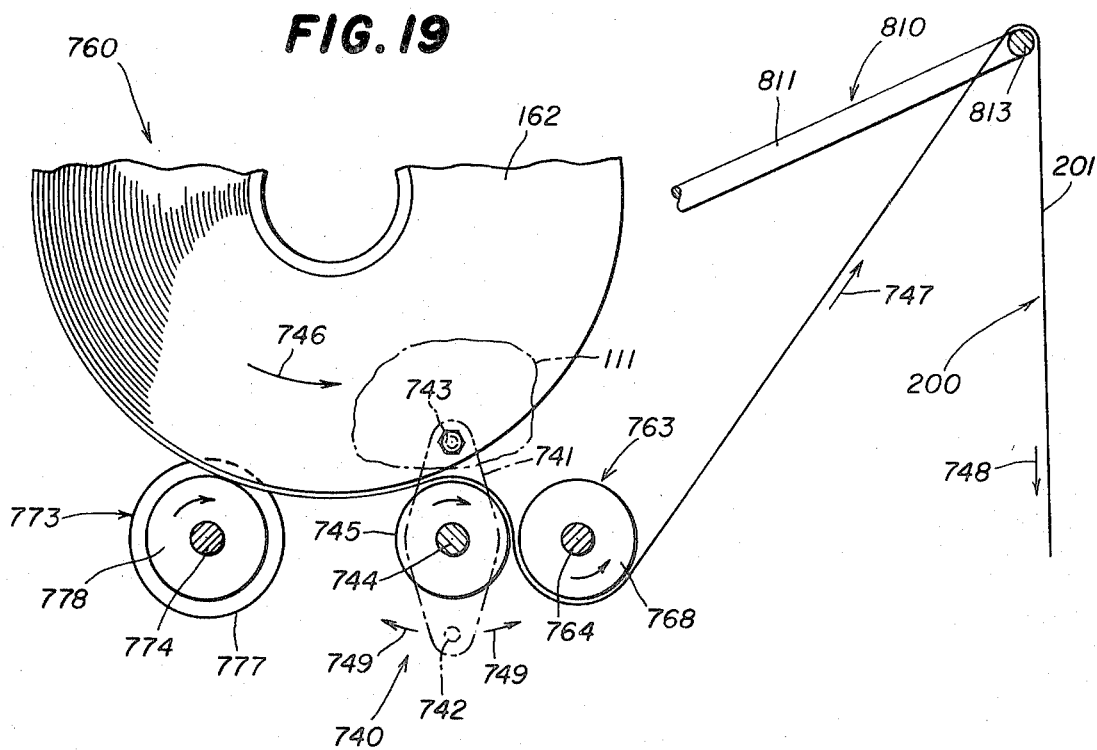
FIGS. 19 and 20 are fragmentary views illustrating an alternative film supply mechanism.
Figure 20:
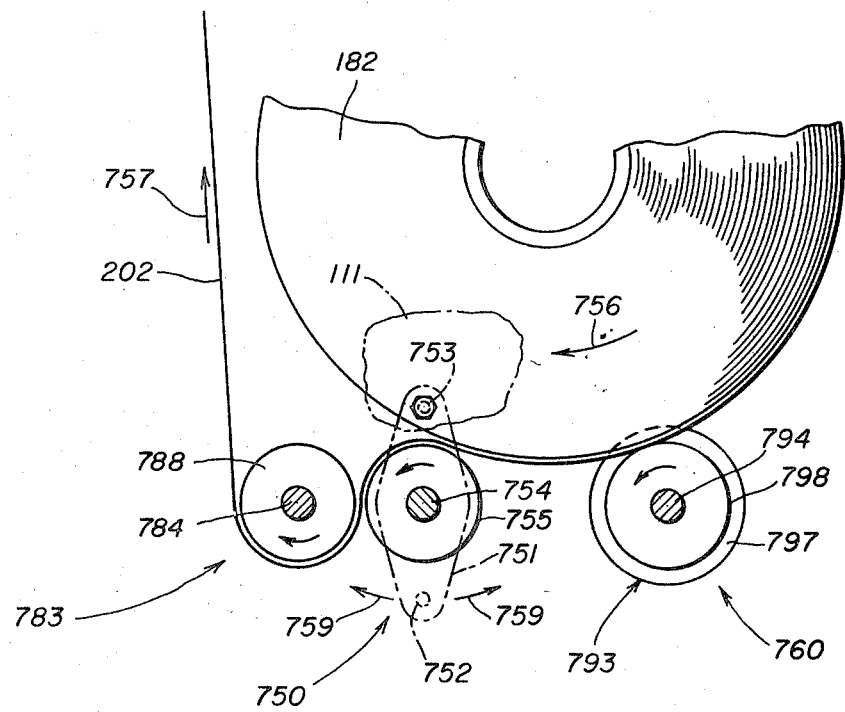

Referring now to FIGS. 19 and 20, there is shown an alternate film supply mechanism 760 which includes an upper film roll 162 supported by a first upper film idler roll 773 which has an upper idler shaft 774 journaled to the upstanding side panels 111 as hereinbefore described with respect to the upper film drive roll 163, the idler roll 773 having a pair of spaced-apart guide flanges 777 and a plurality of knurled rubber wheels 768 all fixedly mounted on the upper idler shaft 774. Spaced apart from the first upper idler roll 773 is a second upper idler roll 740 which includes a pair of free-swinging bearing flanges 741 having holes 742 in the free-swinging ends, the flanges 741 being mounted to the upstanding side panels 111 by fixtures 743. The second upper idler roll 740 also including an idler shaft 744 supported by the flanges 741 and carrying thereon a plurality of spaced-apart knurled rubber wheels 745. As seen, the second idler roll 740 is thus swingedly mounted on the frame 111 for rotation about an axis shiftable in the direction of arrows 749. There is also provided an upper film drive roll 763 including an upper film drive shaft 764 journaled to the upstanding side panels 111 as hereinbefore described with respect to the upper film drive roll 163, the drive shaft 764 carrying a plurality of spaced-apart knurled rubber wheels 768 thereon.

The upper portion 201 of the reach of film 200 is withdrawn from the upper film roll 162 as shown and passes over the second idler roll 740 and under the drive roll 763 and then upward over a bight 813 between a pair of arms 811 of a generally U-shaped tensioning mechanism 810. As the film is withdrawn from the film roll 162, as hereinbefore described, the film roll 162 rotates in the direction shown by an arrow 746, the first and second idler rolls 773 and 740, respectively, and the drive roll 763 all rotate in the directions shown by the arrows thereon, the second idler roll 740 being free to swing in a direction shown by the arrows 749 and the film travels up to and over the tensioning mechanism 810 as shown by two arrows 747 and 748.

The film supply mechanism 760 also includes a lower film roll 182 supported by a first lower film idler roll 793 which includes a first lower idler shaft 794 journaled to the upstanding side panels 111 as hereinbefore described with respect to the upper film drive roll 163, the shaft 794 carrying thereon a pair of spaced-apart guide flanges 797 and a plurality of knurled rubber wheels 798. A second lower film idler roll 750 includes a free-swinging pair of flanges 751 each having a hole 752 in the free-swinging end, and the flanges 751 being mounted on the upstanding side panels 111 by a fixture 753. The second lower idler roll 750 also includes an idler shaft 754 supported by the flanges 751 and carrying thereon a plurality of spaced-apart knurled rubber wheels 755. As seen, the second idler roll 750 is thus swingedly mounted on the upstanding side panels 111 for rotation about an axis shiftable in the direction of arrows 759. There is also provided a lower film drive roll 783 including a lower film drive shaft 784 mounted on the upstanding side panels 111 as hereinbefore described with respect to the upper film drive roll 163, the drive shaft 784 carrying thereon a plurality of spaced-apart knurled rubber wheels 788.

The lower portion 202 of the reach of film 200 is withdrawn from the roll 182 during rotation thereof in the direction of an arrow 756, the film passing over the second idler roll 750, underneath the drive roll 783 and upwards to form a part of the longitudinal reach of film 200, the idler rolls 793 and 750 and the drive roll 783 all rotating in the direction of the arrows shown thereon and the lower portion of the film 202 moving in the direction of an arrow 757.

The alternate embodiment of the film supply mechanism described above prevents clinging of the film to the film roll when the tension of the film on the roll would normally tend to make the film cling and wrap around the roll rather than being withdrawn therefrom. The weight of the film roll on the two idler rolls produces a force which forces the second, freely swingable idler roll against the drive roll and prevents slippage of the film. As the film roll diameter decreases, the perimeter will fall deeper between the two idler rolls and the force of the second idler roll against the drive roll would increase but the weight of the film roll decreases and the force of the second idler roll against the drive roll remains about the same. The distance between the two idler rolls is less than the diameter of the core of the film roll to prevent the core of the film roll from falling between the idler rolls when all the film has been used.

In view of the foregoing, it is apparent that there has been provided an article of manufacture of a workpiece completely enclosed in a heat-sealable film and apparatus and method for manufacturing thereof. While there has been described what is at present considered to be the preferred embodiment of the invention, it will be understood that various modifications may be made therein and it is intended to cover in the appended claims all such modifications as fall within the true spirit and scope of the invention.

I claim:

1. A machine for packaging a workpiece in a heat-sealable film, said machine comprising a frame, a generally U-shaped sealing pad mounted on said frame and shaped to form a film bridge defining a central U-shaped trough therein and defining within said sealing pad a work area, means for establishing a longitudinal reach of film normally disposed adjacent to said sealing pad, a generally U-shaped heater mounted on said frame and shaped and arranged to overlie said sealing pad, means for urging a workpiece against the reach of film and into said work area to provide superimposed lengths of film positioned between said sealing pad and said heater and forming an envelope open along one side and the ends of the workpiece, drive mechanism providing relative movement of said heater and said sealing pad between a receiving position and a sealing-severing position, said sealing pad and said heat in said receiving position being spaced apart to receive a workpiece in said work area, said sealing pad and said heater in said sealing-severing position being juxtaposed to place said heater in said trough and in contact with the superimposed lengths of film to seal and sever the same along one side and the ends of the workpiece, thus to provide a package of a workpiece in a closed envelope of the heat-sealable film and to reestablish a longitudinal reach of film adjacent to said sealing pad.

2. The machine defined in claim 1, wherein said sealing pad includes a pair of spaced-apart generally U-shaped yieldable pads.

3. The machine defined in claim 2, wherein said yieldable pads are made of sponge rubber.

4. The machine defined in claim 1, wherein said sealing pad is fixedly mounted on said frame said heater is shiftably mounted on said frame and movable between said sealing-severing position and said receiving position.

5. The machine defined in claim 1, wherein said heater includes a generally U-shaped knife edge shaped to overlie the trough in said sealing pad.

6. A machine for packaging a workpiece in a heat-sealable film, said machine comprising a frame, a generally U-shaped sealing pad mounted on said frame and defining within said sealing pad a work area, a supply mechanism mounted on said frame for rotatably supporting a roll of heat-sealable film to provide a reach of film normally disposed adjacent to said sealing pad, a generally U-shaped heater mounted on said frame and shaped and arranged to overlie said sealing pad, means for urging a workpiece against the reach of film and into said work area to provide superimposed lengths of film positioned between said sealing pad and said heater and forming an envelope open along one side and the ends of the workpiece, drive mechanism providing relative movement of said heater and said sealing pad between a receiving position and a sealing-severing position, means for operating said supply mechanism to withdraw film from the roll of heat-sealable film to supply the same to the reach of film for forming the envelope during movement of said heater and said sealing pad to said sealing-severing position, said sealing pad and said heater in said receiving position being spaced apart to receive a workpiece in said work area, said sealing pad and said heater in said sealing-severing position being juxtaposed to place said heater in contact with the superimposed lengths of film to seal and sever the same on one side and the ends of the workpiece, thus to provide a package of a workpiece in a closed envelope of a heat-sealable film and to reestablish a reach of film adjacent to said sealing pad.

7. The machine set forth in claim 6, wherein said supply mechanism includes a pair of horizontally disposed spaced-apart rolls for holding a roll of heat-sealable film thereon.

8. The machine set forth in claim 6, wherein said supply mechanism is mounted above said sealing pad and said heater to feed the longitudinal reach of film downwardly adjacent to said sealing pad.

9. The machine set forth in claim 6, and further comprising drive structure positively to feed film from a roll thereof mounted on said supply mechanism.

10. A machine for packaging a workpiece in a heat-sealable film, said machine comprising a frame, a generally U-shaped sealing pad mounted on said frame and defining within said sealing pad a work area, a supply mechanism mounted on said frame for rotatably supporting a roll of heat-sealable film to provide a longitudinal reach of film normally disposed adjacent to said sealing pad, a generally U-shaped heater mounted on said frame and shaped and arranged to overlie said sealing pad, means for urging a workpiece against the reach of film and into said work area to provide superimposed lengths of film positioned between said pad and said heater and forming an envelope open along one side and the ends of the workpiece, drive mechanism providing relative movement of said heater and said sealing pad between a receiving position and a sealing-severing position, means for anchoring the film on the side of said work area opposite that on which is disposed said supply mechanism, operation of said drive mechanism to move said heater and said sealing pad toward one another causing film to be fed from a roll thereof mounted on said supply mechanism into the longitudinal reach of film, said sealing pad and said heater in said receiving position being spaced apart to receive a workpiece in said work area, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a longitudinal reach of film adjacent to said sealing pad.

11. A machine for packaging a workpiece in a heat-sealable film, said machine comprising a frame, a generally U-shaped sealing pad mounted on said frame and defining within said sealing pad a work area, a supply mechanism mounted on said frame for rotatably supporting a roll of heat-sealable film to provide a longitudinal reach of film normally disposed adjacent to said sealing pad, a generally U-shaped heater mounted on said frame and shaped and arranged to overlie said sealing pad, tensioning mechanism mounted on said frame for maintaining the reach of film taut, means for urging a workpiece against the taut reach of film and into said work area to provide superimposed taut lengths of film positioned between said sealing pad and said heater and forming an envelope open along one side and the ends of the workpiece, drive mechanism providing relative movement of said heater and said sealing pad between a receiving position and a sealing-severing position, a film supply drive for withdrawing film from a roll on said supply mechanism and feeding the film into the longitudinal reach of film, said film supply drive being controlled by said tensioning means in response to the tension in the reach of film so as to maintain the reach of film taut during the operation of said drive mechanism between the receiving positions and the sealing-severing positions of said heater and said sealing pad, said sealing pad and said heater in said receiving position being spaced apart to receive a workpiece in said work area, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a longitudinal reach of film adjacent to said sealing pad.

12. A machine for packaging a workpiece in a heat-sealable film, said machine comprising a frame, a generally U-shaped sealing pad mounted on said frame and defining within said sealing pad a work area, a first film supply mechanism mounted on said frame for rotatably supporting a first roll of heat-sealable film, a second film supply mechanism mounted on said frame for rotatably supporting a second roll of heat-sealable film, said first and second film supply mechanisms being spaced apart to provide a reach of film normally disposed adjacent to said sealing pad, the film from the first and second rolls of film being joined at a seam extending transversely of the reach of film adjacent to said sealing pad, a generally U-shaped heater mounted on said frame and shaped and arranged to overlie said sealing pad, means for urging a workpiece against the reach of film and into said work area to provide superimposed lengths of film positioned between said sealing pad and said heater and forming an envelope open along one side and the ends of the workpiece, the film for forming the envelope being withdrawn from the rolls of film on said first and second supply mechanisms, drive mechanism providing relative movement of said heater and said sealing pad between a receiving position and a sealing-severing position, means for operating one of said supply mechanisms to withdraw film from the roll of film supported thereon to supply the same to the reach of film for forming the greater portion of the envelope during movement of said heater and said sealing pad to said sealing-severing position, said sealing pad and said heater in said receiving position being spaced apart to receive a workpiece in said work area, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a reach of film adjacent to said sealing pad with a seam extending transversely of the reach of film adjacent to said sealing pad.

13. The machine defined in claim 12, wherein said means for withdrawing film from one of said film supply mechanisms is operative to withdraw film from the roll on said first film supply mechanism and during the movement of said sealing pad and said heater to the sealing-severing positions thereof.

14. The machine defined in claim 12, wherein said means for withdrawing film from one of said film supply mechanisms is operative to withdraw film from the roll on said second film supply mechanism after the movement of said sealing pad and said heater to the sealing-severing positions thereof to change the position of the seam relative thereto.

15. A machine for packaging a workpiece in a heat-sealable film, said machine comprising a frame, a generally U-shaped sealing pad mounted on said frame and defining within said sealing pad a work area, a first film supply mechanism mounted on said frame for rotatably supporting a first roll of heat-sealable film, a second film supply mechanism mounted on said frame for rotatably supporting a second roll of heat-sealable film, said first and second film supply mechanisms being spaced apart to provide a longitudinal reach of film normally disposed adjacent to said sealing pad, the film from the first and second rolls of film being joined at a seam extending transversely of the reach of film adjacent to said sealing pad, a generally U-shaped heater mounted on said frame and shaped and arranged to overlie said sealing pad, means for urging a workpiece against the reach of film and into said work area to provide superimposed lengths of film positioned between said sealing pad and said heater and forming an envelope open along one side and the ends of the workpiece, drive mechanism providing relative movement of said heater and said sealing pad between a receiving position and a sealing-severing position, means for operating said first supply mechanism to withdraw film from the first roll to supply the same to the reach of film during movement of said heater and said sealing pad to said sealing-severing position for forming the envelope, means for operating said second supply mechanism to withdraw film from the second roll to supply a small amount of the same to the reach of film when said heater and said sealing pad are in said sealing-severing position for indexing the seam with respect to said sealing pad, said sealing pad and said heater in said receiving position being spaced apart to receive a workpiece in said work area, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a longitudinal reach of film adjacent to said sealing pad with a seam extending transversely of the reach of film adjacent to said sealing pad.

16. A machine for packaging a workpiece in a heat-sealable film, said machine comprising a frame, a generally U-shaped sealing pad mounted on said frame and defining within said sealing pad a work area, means for establishing a longitudinal reach of film normally disposed adjacent to said sealing pad, a generally U-shaped heater mounted on said frame and shaped and arranged to overlie said sealing pad, a feed platform mounted on said frame and shiftable between a workpiece-receiving position and a workpiece-delivery position, said feed platform in said workpiece-delivery position being disposed adjacent to said sealing pad in position to receive a workpiece, said feed platform in said workpiece-delivery position urging the workpiece against the reach of film and into said work area to provide superimposed lengths of film positioned between said sealing pad and said heater and forming an envelope open along one side and the ends of the workpiece, and drive mechanism providing relative movement of said heater and said sealing pad between a receiving position and a sealing-severing position, said sealing pad and said heater in said receiving position being spaced apart to receive a workpiece in said work area when said feed platform is in said workpiece-delivery position, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a longitudinal reach of film adjacent to said sealing pad.

17. The machine set forth in claim 16 and further comprising second drive mechanism mounted on said frame for moving said platform between said workpiece-receiving position and said workpiece-delivery position.

18. The machine defined in claim 16, and further comprising an infeed conveyor system adjacent said feed platform for transferring a workpiece to said feed platform when said feed platform is in said workpiece-receiving position.

19. A machine for packaging a workpiece in a heat-sealable film, said machine comprising a frame, a generally U-shaped sealing pad mounted on said frame and defining within said sealing pad a work area, a chute positioned below said work area to receive a workpiece and extending to a discharge point, means for establishing a longitudinal reach of the film normally disposed adjacent to said sealing pad, a generally U-shaped heater mounted on said frame and shaped and arranged to overlie said sealing pad, a feed platform mounted on said frame and shiftable between a workpiece-receiving position and a workpiece-delivery position, said feed platform in said workpiece-receiving position being disposed adjacent to said sealing pad in position to receive a workpiece, said feed platform in said workpiece-delivery position urging the workpiece against the reach of film thereby causing the workpiece to fall into said work area and upon said chute to provide superimposed lengths of film positioned between said sealing pad and said heater and forming an envelope open along one side and the ends of the workpiece, and drive mechanism providing relative movement of said heater and said sealing pad between a receiving position and a sealing-severing position, said sealing pad and said heater in said receiving position being spaced apart to receive a workpiece in said work area and upon said chute when said feed platform is in said workpiece-delivery position, said sealing pad and said heater in said sealing-severing position being juxtaposed to place said heater in contact with the superimposed lengths of film to seal and to sever the same along one side and the ends of the workpiece, thus to provide a package of a workpiece in a closed envelope of the heat-sealable film and to reestablish a longitudinal reach of film adjacent to said sealing pad, the package exiting from said machine along said chute to said discharge point.

20. A machine for packaging a cylindrical workpiece in a heat-sealable film, said machine comprising a frame, a generally U-shaped sealing pad fixedly mounted on said frame, said sealing pad having two spaced-apart generally parallel legs and a bight interconnecting said legs and extending therebeyond, said bight and said legs all having a central trough therealong and cooperating to define a work area therebetween, first cooling means disposed in said trough for cooling said sealing pad, a chute positioned below said work area to receive a workpiece thereon and extending to a discharge point, a first film supply mechanism mounted on said frame for rotatably supporting a first roll of heat-sealable film, second film supply mechanism mounted on said frame for rotatably supporting a second roll of heat-sealable film, said first and second supply mechanisms become spaced apart to provide a longitudinal reach of film normally disposed adjacent to said sealing pad and having a width no greater than the length of said bight with a seam extending transversely thereof, a generally U-shaped heater shiftably mounted on said frame and having two spaced-apart generally parallel legs and a bight interconnecting said legs and extending therebeyond, a guide mounted on said heater and having second cooling means in thermal contact therewith, a feed platform mounted on said frame and shiftable between a workpiece-receiving position and a workpiece-delivery position, said feed platform in said workpiece-receiving position being disposed adjacent to said sealing pad in position to receive a workpiece, said feed platform in said workpiece-delivery position urging the workpiece against the reach of film and into said work area and onto said chute to provide superimposed lengths of film positioned between said sealing pad and said heater and forming an envelope open along one side and the ends of the workpiece, drive mechanism providing movement of said heater between a receiving position and a sealing-severing position, tensioning means mounted on said frame for maintaining the reach of film taut, means for operating said first supply mechanism to withdraw film from the first roll to supply the same to the reach of film during movement of said heater and said sealing pad to said sealing-severing position for forming the envelope, means for operating said second supply mechanism to withdraw film from the second roll to supply a small amount of the same to the reach of film when said heater and said sealing pad are in said sealing-severing position for indexing the seam with respect to said sealing pad, said heater in said receiving position being spaced apart from said sealing pad to receive a workpiece in said work area, said heater in said sealing-severing position being juxtaposed with said sealing pad to place said heater in contact with the superimposed lengths of the film to seal and sever the same along one side and the ends of the workpiece, said first and second cooling means cooperating when said heater is in said sealing-severing position to cool the lengths of film adjacent to said heater and said sealing pad, thus to provide a package of a workpiece in a closed envelope of the heat-sealable film and to reestablish a longitudinal reach of film adjacent to said sealing pad with a seam extending transversely of the reach of film adjacent to said sealing pad, the package exiting from said machine along said chute to said discharge point.

21. A machine for packaging a workpiece in a heat-sealable film, said machine comprising a frame, a general U-shaped sealing pad mounted on said frame and defining within said sealing pad a work area, a supply mechanism mounted on said frame for rotatably supporting a roll of heat-sealable film and to provide a longitudinal reach of film normally disposed adjacent to said sealing pad, said supply mechanism including a first idler roller mounted on said frame for rotation about a fixed axis and a second idler roller swingably mounted upon said frame for rotation about a shiftable axis and a drive roller mounted on said frame for rotation about a fixed axis, said second idler roller being disposed between said first idler roller and said drive roller and cooperating with said first idler roller to support a roll of heat-sealable film thereon, a generally U-shaped heater mounted on said frame and shaped and arranged to overlie said sealing pad, means for urging a workpiece against the reach of film and into said work area to provide superimposed lengths of film positioned between said sealing pad and said heater and forming an envelope open along one side and the ends of the workpiece, drive mechanism providing relative movement of said heater and said sealing pad between a receiving position and a sealing-severing position, said sealing pad and said heater in said receiving position being spaced apart to receive a workpiece in said work area, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a longitudinal reach of film adjacent to said sealing pad.

22. A machine for packaging a workpiece in a heat-sealable film, said machine comprising a frame, a generally U-shaped sealing pad mounted on said frame and defining within said sealing pad a work area, a first film supply mechanism mounted on said frame for rotatably supporting a first roll of heat-sealable film, a second film supply mechanism mounted on said frame for rotatably supporting a second roll of heat-sealable film, each of said film supply mechanisms including a first idler roller mounted on said frame for rotation about a fixed axis and a second idler roller swingably mounted upon said frame for rotation upon a shiftable axis and a drive mechanism mounted upon said frame for rotation about a fixed axis, said second idler roller being disposed between said first idler roller and said drive roller in each of said supply mechanisms and cooperating with said first idler roller to support an associated roll of heat-sealable film thereon, said first and second film supply mechanisms being spaced apart to provide a longitudinal reach of film normally disposed adjacent to said sealing pad, the film from the first and second rolls of film being joined at a seam extending transversely of the reach of film adjacent to said sealing pad, a generally U-shaped heater mounted on said frame and shaped and arranged to overlie said sealing pad, means for urging a workpiece against the reach of film and into said work area to provide superimposed lengths of film positioned between said sealing pad and said heater and forming an envelope open along one side and the ends of the workpiece, the film for forming the envelope being withdrawn from the rolls of film on said first and second supply mechanisms, drive mechanism providing relative movement of said heater and said sealing pad between a receiving position and a sealing-severing position, said sealing pad and said heater in said receiving position being spaced apart to receive a workpiece in said work area, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a longitudinal reach of film adjacent to said sealing pad with a seam extending transversely of the reach of film adjacent to said sealing pad.

23. A machine for packaging a workpiece in a heat-sealable film, said machine comprising a frame, a generally U-shaped sealing pad mounted on said frame and having a U-shaped central trough therein and defining within said sealing pad a work area, means for establishing a reach of film normally disposed adjacent to said sealing pad, a generally U-shaped heater mounted on said frame and shaped and arranged to overlie said sealing pad, a film guide mounted on said frame adjacent to said heater and positioned normally to hold the film adjacent to but out of contact with said heater, means for urging a workpiece against the reach of film and into said work area, drive mechanism providing relative movement of said heater with said guide and said sealing pad between a receiving position and a sealing-severing position, said guide and said sealing pad cooperating in the sealing-severing positions thereof to provide superimposed lengths of film positioned therebetween and forming an envelope open along one side and the ends of the workpiece, said heater in the sealing-severing position thereof overlying trough and contacting the superimposed lengths of film bridged thereacross to seal and sever the same along one side and the ends of the workpiece, said sealing pad having the surfaces thereof adjacent to said trough sloping away from said trough and said guide, said guide including spaced-apart portions bridging said trough in the sealing-severing positions of the parts to hold the superimposed lengths of film taut across said trough, thus to provide a package of a workpiece in a closed envelope of the heat-sealable film and to reestablish a reach of film adjacent to said sealing pad.

24. A machine for packaging a workpiece in a heat-sealable film, said machine comprising a frame, a generally U-shaped sealing pad mounted on said frame and defining within said sealing pad a work area, a first film supply mechanism mounted on said frame for rotatably supporting a first roll of heat-sealable film, a second film supply mechanism mounted on said frame for rotatably supporting a second roll of heat-sealable film, said first and second film supply mechanisms being spaced apart to provide a reach of film normally disposed adjacent to said sealing pad, the film from the first and second rolls of film being joined at a seam extending transversely of the reach of film adjacent to said sealing pad, tensioning means mounted on said frame adjacent to one of said film supply mechanisms for maintaining the reach of film taut, a generally U-shaped heater mounted on said frame and shaped and arranged to overlie said sealing pad, means for urging a workpiece against the reach of film and into said work area to provide superimposed lengths of film positioned between said sealing pad and said heater and forming an envelope open along one side and the ends of the workpiece, the film for forming the envelope being withdrawn from the rolls of film on said first and second supply mechanisms, drive mechanism providing relative movement of said heater and said sealing pad between a receiving position and a sealing-severing position, said sealing pad and said heater in said receiving position being spaced apart to receive a workpiece in said work area, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a reach of film adjacent to said sealing pad with a seam extending transversely of the reach of film adjacent to said sealing pad.

25. A machine for packaging a workpiece in a heat-sealable film, said machine comprising a frame, a generally U-shaped sealing pad mounted on said frame and defining within said sealing pad a work area, means for establishing a reach of film normally disposed adjacent to said sealing pad, a generally U-shaped heater mounted on said frame and shaped and arranged to overlie said sealing pad, a feed platform pivotally mounted on said frame and pivotable between a workpiece-receiving position and a workpiece-delivery position, said feed platform in said workpiece-receiving position being disposed adjacent to said sealing pad in position to receive a workpiece, said feed platform in said workpiece-delivery position urging the workpiece against the reach of film and into said work area to provide superimposed lengths of film positioned between said sealing pad and said heater and forming an envelope open along one side and the ends of the workpiece, and drive mechanism providing relative movement of said heater and said sealing pad between a receiving position and a sealing-severing position, said sealing pad and said heater in said receiving position being spaced apart to receive a workpiece in said work area when said feed platform is in said workpiece-delivery position, said sealing pad and said heater in said sealing-severing position being juxtaposed to place said heater in contact with the superimposed lengths of film to seal and sever the same along one side and the ends of the workpiece, thus to provide a package of a workpiece in a closed envelope of the heat-sealable film and to reestablish a reach of film adjacent to said sealing pad.

26. A method of packaging a cylindrical workpiece in a heat-sealable film comprising establishing a longitudinal reach of film including lengths from two spaced-apart film supplies joined together at a seam extending transversely of the reach of film, urging the workpiece along an entire longitudinal side thereof against a reach of film to form an envelope open along a longitudinal side and at least one end of the workpiece, withdrawing film from one of the film supplies to form the envelope during the urging of the workpiece against the reach of film, heat-sealing the open portions of the envelope to form a package of a cylindrical workpiece in a closed envelope and indexing the other film supply during the heat-sealing of the envelope to introduce a small amount of film into the reach of film and provide displacement of the seam.

* * * * *

UNITED STATES PATENT OFFICE
CERTIFICATE OF CORRECTION

Patent No. 3,643,397      Dated February 22, 1972

Inventor(s) Erwin B. Bahnsen

It is certified that error appears in the above-identified patent and that said Letters Patent are hereby corrected as shown below:

Claim 16, column 14, line 53, "workpiece-delivery" should be --workpiece-receiving--.

Signed and sealed this 13th day of June 1972.

(SEAL)
Attest:

EDWARD M. FLETCHER, JR.       ROBERT GOTTSCHALK
Attesting Officer       Commissioner of Patents